(12) United States Patent
Pajukoski et al.

(10) Patent No.: US 11,750,423 B2
(45) Date of Patent: Sep. 5, 2023

(54) COMMON PHASE ERROR AND/OR INTER-CARRIER INTERFERENCE

(71) Applicant: Nokia Technologies Oy, Espoo (FI)

(72) Inventors: Kari Pajukoski, Oulu (FI); Sami Hakola, Kempele (FI); Esa Tiirola, Kempele (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 17/179,622

(22) Filed: Feb. 19, 2021

(65) Prior Publication Data
US 2021/0176099 A1    Jun. 10, 2021

Related U.S. Application Data

(63) Continuation of application No. 16/083,032, filed as application No. PCT/FI2016/050184 on Mar. 23, 2016.

(51) Int. Cl.
*H04L 25/03*    (2006.01)
*H04L 5/00*    (2006.01)
(Continued)

(52) U.S. Cl.
CPC ...... *H04L 25/03821* (2013.01); *H04L 5/0048* (2013.01); *H04L 5/0053* (2013.01);
(Continued)

(58) Field of Classification Search
CPC ............ H04L 25/03821; H04L 5/0048; H04L 5/0053; H04L 25/03; H04L 25/26;
(Continued)

(56) References Cited

U.S. PATENT DOCUMENTS 7,643,567 B2    1/2010 Egashira et al.
7,792,219 B2    9/2010 Lee et al.
(Continued)

FOREIGN PATENT DOCUMENTS

CN    101221230 A    7/2008
CN    102971975 A    3/2013
(Continued)

OTHER PUBLICATIONS

Notice of Allowance for U.S. Appl. No. 16/083,032 dated May 4, 2021.
(Continued)

*Primary Examiner* — Janice N Tieu
(74) *Attorney, Agent, or Firm* — ALSTON & BIRD LLP

(57) ABSTRACT

Described are methods for dealing with phase noise, e.g., common phase error and/or inter-carrier interference, in communication systems, and apparatuses for the same. A method can include at least: transmitting one or more reference signals (in-band signals within a channel); and mapping the reference signals to radio resources in the channel for transmission of the reference signals. An amount of the radio resources may depend on, e.g., information about a modulation and coding scheme used for transmission. An associated method can include at least: receiving one or more reference signals, and mapping the reference signals to radio resources in the channel for reception of the reference signals; receiving information about a modulation and coding scheme to be used, an amount of the radio resources depending on, e.g., information about the modulation and coding scheme used for reception; and using the reference signals to compensate for phase noise.

12 Claims, 6 Drawing Sheets

---

Making from UE8, within a set of OFDM radio resources allocated to a single set of spatially multiplexed UEs 8, radio transmissions from which data and/or control information can be extracted at the eNB 2; and transmitting, within the same said set of radio resources, CPE/ICI-RS for use by the eNB 2 in performing common phase error connection and/or inter-carrier interference cancellation as part of extracting data and/or control information from said radio transmissions made within the same said set of OFDM radio resources ⸺ 702

Performing common phase error connection and/or inter carrier interference cancellation at a eNB 2 using CPE/ICI-RS within said set of OFDM resources as part of extracting data and/or control information from said radio transmissions by Ues 8 within said set of OFDM radio resources ⸺ 704

(51) Int. Cl.
  *H04L 27/26* (2006.01)
  *H04L 27/00* (2006.01)
(52) U.S. Cl.
  CPC .............. *H04L 25/03* (2013.01); *H04L 27/26* (2013.01); *H04L 27/2691* (2013.01); *H04L 5/0007* (2013.01); *H04L 27/2613* (2013.01); *H04L 2027/0016* (2013.01); *H04L 2027/0026* (2013.01); *H04L 2027/0087* (2013.01)
(58) Field of Classification Search
  CPC ... H04L 27/26; H04L 27/2691; H04L 5/0007; H04L 27/2613; H04L 2027/0016; H04L 2027/0026; H04L 2027/0087; H04L 7/041; H04L 25/03012
  See application file for complete search history.

(56) References Cited

U.S. PATENT DOCUMENTS

| | | | |
|---|---|---|---|
| 8,064,528 | B2 | 11/2011 | Giannakis et al. |
| 8,199,845 | B2 | 6/2012 | Yu et al. |
| 8,331,506 | B2 | 12/2012 | Park et al. |
| 8,705,496 | B2 | 4/2014 | Cho et al. |
| 8,948,154 | B2 | 2/2015 | Gaal et al. |
| 9,419,830 | B2 | 8/2016 | Khoryaev et al. |
| 9,509,543 | B2 | 11/2016 | Gaal et al. |
| 9,629,158 | B2 | 4/2017 | Yu et al. |
| 9,667,457 | B2 | 5/2017 | Yamazaki et al. |
| 9,995,625 | B2 | 6/2018 | Song et al. |
| 10,097,255 | B2 | 10/2018 | Cezanne et al. |
| 10,129,052 | B2 | 11/2018 | Subramanian et al. |
| 10,484,223 | B2 | 11/2019 | Hessler et al. |
| 10,644,858 | B2 | 5/2020 | Hessler et al. |
| 10,863,313 | B2 | 12/2020 | Markhovsky et al. |
| 10,873,830 | B2 | 12/2020 | Markhovsky et al. |
| 11,012,272 | B2 | 5/2021 | Gaal et al. |
| 11,146,429 | B2 | 10/2021 | Pajukoski et al. |
| 2008/0075205 | A1 | 3/2008 | Lee et al. |
| 2008/0159423 | A1 | 7/2008 | Omoto et al. |
| 2011/0044259 | A1 | 2/2011 | Nimbalker et al. |
| 2012/0008952 | A1 | 1/2012 | Li et al. |
| 2012/0063405 | A1* | 3/2012 | Han ..................... H04L 5/0023 370/329 |
| 2013/0163530 | A1 | 6/2013 | Chen et al. |
| 2014/0169434 | A1 | 6/2014 | Hewavithana et al. |
| 2014/0198749 | A1* | 7/2014 | Luo ..................... H04W 72/042 370/329 |
| 2014/0226638 | A1 | 8/2014 | Xu et al. |
| 2014/0269520 | A1 | 9/2014 | Yi et al. |
| 2016/0056977 | A1 | 2/2016 | Wang et al. |
| 2017/0048086 | A1 | 2/2017 | Subramanian et al. |
| 2017/0118055 | A1 | 4/2017 | Guey et al. |
| 2017/0214518 | A1* | 7/2017 | Oh ..................... H04L 25/0214 |
| 2018/0198667 | A1 | 7/2018 | He |
| 2019/0081825 | A1 | 3/2019 | Pajukoski et al. |
| 2021/0176099 | A1 | 6/2021 | Pajukoski et al. |

FOREIGN PATENT DOCUMENTS

| | | |
|---|---|---|
| EP | 1 178 640 A1 | 2/2002 |
| EP | 2962501 | 1/2016 |
| EP | 3414864 | 12/2018 |
| EP | 3414865 | 12/2018 |
| WO | WO 2014/003598 A1 | 1/2014 |
| WO | WO 2014/153777 A1 | 10/2014 |
| WO | WO 2016/196627 A1 | 12/2016 |
| WO | WO 2017/138871 A1 | 8/2017 |
| WO | WO 2017/138880 A1 | 8/2017 |
| WO | WO 2017/162903 A1 | 9/2017 |

OTHER PUBLICATIONS

Office Action for Chinese Application No. 201680084006.9 dated Feb. 2, 2021, 20 pages.
Office Action for European Application No. 16895296.8 dated Mar. 22, 2021, 5 pages.
Office Action for Chinese Application No. 201680084006.9 dated Jun. 22, 2021, 6 pages.
Office Action for Korean Application No. 2021-7014738 dated Jun. 14, 2021, 6 pages.
U.S. Appl. No. 16/083,032, filed Sep. 7, 2018, US 2019/0081825 A1, Pending.
"IEEE Standard for Information technology—Telecommunications and information exchange between systems—Local and metropolitan area networks—Specific requirements—Part 11: Wireless LAN Medium Access Control (MAC) and Physical Layer (PHY) Specifications Amendment 3: Enhancements for Very High Throughput in the 60 GHz Band", IEEE Std 802.11ad-2012 (Dec. 28, 2012), 628 pages.
Decision to Grant for Korean Application No. 2020-7023093 dated Feb. 22, 2021, 4 pages.
Extended European Search Report for European U.S. Appl. No. 16/895,296 dated Nov. 7, 2019.
Final Office Action for U.S. Appl. No. 16/083,032 dated Jun. 7, 2019, 10 pages.
Final Office Action for U.S. Appl. No. 16/083,032 dated May 1, 2020, 9 pages.
Final Rejection for Korean Application No. 2018-7030545 dated Feb. 24, 2020, 8 pages.
Final Rejection for Korean Application No. 2018-7030545 dated Jul. 9, 2020, 3 pages.
First Examination Report for India Application No. 201847036118 dated Sep. 16, 2020, 9 pages.
International Search Report and Written Opinion for PCT Application No. PCT/FI2016/050184 dated Jun. 14, 2016.
Non-Final Office Action for U.S. Appl. No. 16/083,032 dated Feb. 4, 2019, 10 pages.
Non-Final Office Action for U.S. Appl. No. 16/083,032 dated Nov. 20, 2019, 9 pages.
Notice of Allowance for U.S. Appl. No. 16/083,032 dated Dec. 4, 2020, 9 pages.
Office Action and Search Report for Russian Application No. 2018135482/08 dated Sep. 3, 2019, 10 pages.
Office Action for Korean Application No. 2018-7030545 dated Aug. 2, 2019, 8 pages.
Office Action for Korean Application No. 2020-7023093 dated Aug. 29, 2020, 5 pages.
R1-131236, "On Uplink Reference Signal Overhead Reduction in Small Cells", Nokia Siemens Networks, 3GPP TSG RAN WG1 Meeting #72bis, Apr. 2013, 3 pages.
R1-131321, "Adaptive UE Specific Reference Signal Design", Broadcom Corporation, 3GPP TSG RAN WG1 Meeting #72bis, Apr. 2013, 4 pgs.
R1-153882, "DM-RS Enhancement for High Order MU-MIMO", Qualcomm Inc., 3GPP TSG-RAN WG1 #82, Aug. 2015, 5 pages.
Notice of Allowance for Korean Application No. 10-2021-7014738 dated Jan. 27, 2022, 3 pages.
Huawei et al., "Discussion on DMRS enhancement", 3GPP TSG RAN WG1 Meeting #82bis, R1-155081, (Oct. 5-9, 2015), 5 pages.
CATT, "SRS Enhancements for EB-FD-MIMO", 3GPP TSG RAN WG1 Meeting #82bis, R1-155206, (Oct. 5-9, 2015), 3 pages.
ZTE, "DM-RS Enhancement for V2V", 3GPP TSG-RAN WG1 Meeting #82bis, R1-155233, (Oct. 5-9, 2015), 3 pages.
Alcatel-Lucent, "CSI measurement and reporting for Beamformed CSI-RS schemes", 3GPP TSG RAN WG1 Meeting #82bis, R1-155250, (Oct. 5-9, 2015), 5 pages.
NEC, "Discussion on DRS enhancement for LAA", 3GPP TSG RAN WG1 Meeting #82bis, R1-155276, (Oct. 5-9, 2015), 3 pages.
NEC, "Discussion onbeamformed CSI-RS-based scheme", 3GPP TSG RAN WG1 Meeting #82bis, R1-155279, (Oct. 5-9, 2015), 4 pages.
NEC, "Design for DMRS enhancement considering power imbalance issue", 3GPP TSG RAN WG1 Meeting #82bis, R1-155282, (Oct. 5-9, 2015), 4 pages.
Intel Corporation, "On the need of the flexible CSI-RS configuration for non precoded CSI-RS", 3GPP TSG RAN WG1 Meeting #82bis, R1-155318, (Oct. 5-9, 2015), 3 pages.

(56) References Cited

OTHER PUBLICATIONS

Intel Corporation, "Support of the additional DM-RS antenna ports for MU-MIMO", 3GPP TSG RAN WG1 Meeting #82bis, R1-155319, (Oct. 5-9, 2015), 4 pages.
LG Electronics, "Further details on CQI/MCS/TBS table design for MTC", 3GPP TSG RAN WG2 Meeting #82bis, R1-155368, (Oct. 5-9, 2015), 4 pages.
Huawei et al., "CQI and MCS tables", 3GPP TSG RAN WG1 Meeting #82bis, R1-155661, (Oct. 5-9, 2015), 5 pages.
Huawei et al., "Discussion on DL RS and UL RS for short TTI", 3GPP TSG RAN WG1 Meeting #83, R1-156460, (Nov. 15-22, 2015), 4 pages.
CATT, "Remaining details of LAA DRS design", 3GPP TSG RAN WG1 Meeting #83, R1-156578, (Nov. 15-22, 2015), 4 pages.
CATT, "SRS enhancements for EB/FD-MIMO", 3GPP TSG RAN WG1 Meeting #83, R1-156589, (Nov. 15-22, 2015), 5 pages.
Samsung, "Remaining details of DRS design", 3GPP TSG RAN WG1 Meeting #83, R1-156765, (Nov. 15-22, 2015), 2 pages.
Huawei et al., "CQI and MCS tables", 3GPP TSG RAN WG1 Meeting #83, R1-156929, (Nov. 15-22, 2015), 4 pages.
Qualcomm Incorporated, "Draft CR Introduction of PRS based Terrestrial Beacon Systems", 3GPP TSG-RAN WG1 Meeting #83, R1-157064, (Nov. 16-20, 2015), 5 pages.
Ericsson, "CSI-RS Design for Class A FD-MIMO", 3GPP TSG-RAN WG1 #83, R1-157204, (Nov. 16-20, 2015), 10 pages.
NTT Docomo, "Evaluations of DMRS enhancement for PC5-based V2V", 3GPP TSG RAN WG1 Meeting #83, R1-157314, (Nov. 15-22, 2015), 5 pages.
Samsung, "Summary on CSI-RS Enhancement for Class A Reporting", 3GPP TSG RAN WG1 #83, R1-157546, (Nov. 15-22, 2015), 6 pages.
CATT et al., "WF on DMRS enhancement", 3GPP TSG RAN WG1 Meeting #83, R1-157582, (Nov. 15-22, 2015), 3 pages.
ZTE, "WF on remaining details of SRS Enhancements", 3GPP TSG RAN1 Meeting #83, R1-157616, (Nov. 15-22, 2015), 4 pages.
Ericsson et al., "Way forward on VCID for SRS", 3GPP TSG-RAN WG1 #83, R1-157624, (Nov. 16-20, 2015), 2 pages.
Huawei et al., "WF on CRS and CSI-RS power indication", 3GPP TSG RAN WG1 #83, R1-157691, (Nov. 15-22, 2015), 2 pages.
Samsung et al., "WF on FD-MIMO CSI-RS", 3GPP TSG-RAN WG1 #83, R1-157710, (Nov. 16-20, 2015), 9 pages.
Huawei et al., "WF on DCI signalling for DMRS enhancement", 3GPP TSG RAN WG1 Meeting #83, R1-157776, (Nov. 15-22, 2015), 3 pages.
NEC, "WF on CSI-RS pattern swapping for 12 ports", 3GPP TSG RAN WG1 Meeting #83, R1-157793, (Nov. 15-22, 2015), 3 pages.
ZTE et al., "Introduction of RS-SINR measurement for Multicamer Load Distribution", 3GPP TSG-RAN WG1 Meeting #83, R1-157805, (Nov. 15-22, 2015), 2 pages.
CATT et al., "WF on CSI-RS indexing in special subframe", 3GPP TSG RAN WG1 Meeting #83, R1-157810, (Nov. 15-22, 2015), 3 pages.
Interdigital et al., "WF on SRS for eMTC", 3GP TSG RAN WG1 Meeting #83, R1-157823, (Nov. 15-22, 2015), 3 pages.
ETRI, "Uplink DMRS design for NB-IoT", 3GPP TSG RAN WG1 NB-IoT Ad-Hoc Meeting, R1-160125, (Feb. 18-20, 2016), 3 pages.
CATT, "RS design for NB-IoT", 3GPP TSG RAN WG1 NB-IoT Ad-Hoc Meeting, R1-160147, (Jan. 18-20, 2016), 2 pages.
Panasonic, "MCS/TBS Determination for initial partial DL subframes", 3GPP TSG-RAN WG1 Meeting #84, Rl-160795, (Feb. 15-19, 2016), 5 pages.
Panasonic, "WF on encoding method of MCS/TBS values for NB-PDSCH", 3GPP TSG RAN WG1 Meeting #84, R1-161237, (Feb. 15-19, 2016), 3 pages.
ZTE et al., "Correction to the additional UpPTS symbols for SRS", 3GPP TSG-RAN WG1 Meeting #84, R1-161305, (Feb. 15-19, 2016), 8 pages.
Ericsson et al.,"WF on CRS usage in NB-IoT", 3GPP TSG RAN WG1 #84, R1-161308, (Feb. 15-19, 2016), 3 pages.

RAN WG2, "Reply LS on RSU Scenarios", 3GPP TSG RAN WG1 Meeting #84, R1-161395, (Feb. 15-19, 2016), 1 page.
Samsung et al., "Draft CR on CSI-RS resource in 36.213", R1-161407, (Feb. 15-19, 2016), 5 pages.
LG Electronics et al., "WF on partial subframe and SRS transmission in eLAA", 3GPP TSG RAN WG1 #84, R1-161408, (Feb. 15-19, 2016), 4 pages.
ZTE, "WF on MCS/TBS table design for NB-PDSCH", 3GPP TSG RAN WG1 #84 Meeting, R1-161412, (Feb. 15-19, 2016), 19 pages.
LG Electronics et al., "WF on DM-RS design for PUSCH", 3GPP TSG RAN WG1 #84, R1-161448, (Feb. 15-19, 2016), 7 pages.
Huawei et al., "WF on aperiodic SRS without PUSCH in Rel-14 eLAA", 3GPP TSG-RAN WG1 #84, R1-161456, (Feb. 15-19, 2016), 2 pages.
ZTE et al., "Correction on Precoding and definition of DMRS ports", 3GPP TSG RAN WG1 #84, R1-161487, (Feb. 15-19, 2016), 11 pages.
Qualcomm Inc., "Summary of offline discussion on SRS dropping", 3GPP TSG RAN WG1 Meeting #84, R1-161492, (Feb. 15-19, 2016), 2 pages.
ZTE, "Correction to the UE's assumption on DMRS ports", 3GPP TSG RAN WG1 Meeting #84, R1-161494, (Feb. 15-19, 2016), 2 pages.
Qualcomm Incorporated et al., "CSI-RS in DwPTS", 3GPP TSG-RAN Meeting #84, R1-161514, (Feb. 15-19, 2016), 3 pages.
"3rd Generation Partnership Project; Technical Specification Group Radio Access Network; NR; Physical layer procedures for data (Release 15)", 3GPP TS 38.214 v15.0.0, (Dec. 2017), 71 pages.
"3rd Generation Partnership Project; Technical Specification Group Radio Access Network; NR; Physical channels and modulation (Release 15)", 3GPP TS 38.211 v15.8.0. (Dec. 2019), 97 pages.
"3rd Generation Partnership Project; Technical Specification Group Radio Access Network; NR; Physical layer procedures for data (Release 15)", 3GPP TS 38.214 v15.11.0, (Sep. 2020), 106 pages.
Qi, Y., "5G NR: Key Features and Enhancements—An Overview of 5G NR Key Technical Features and Enhancements for Massive MIMO, mmWave, etc.", CW Connecting the Digital World, Samsung Electronics R&D Institute UK, (Sep. 20, 2018), 19 pages.
Techplayon, "5G NR Reference Signals (DMRS, PTRS, SRS and CSI-RS)", Retrieved from the Internet, [Retrieved on Oct. 27, 2022], URL<http://www.techplayon.com/5g-nr-reference-signals-dmrs-ptrssrs-and-csi- rs/>, (Sep. 26, 2018), 11 pages.
Zaidi et al., "Designing for the Future—The 5G NR Physical Layer", Ericsson Technology Review, Charting the Future of Innovation, #7-2017, (Jul. 24, 2017). 14 pages.
"3rd Generation Partnership Project; Technical Specification Group Radio Access Network; NR; NR and NG-RAN Overall Description; Stage 2 (Release 15)", 3GPP TS 38.300 v15.13.0, (Jun. 2021), 102 pages.
"3rd Generation Partnership Project; Technical Specification Group Radio Access Network; NR; Physical channels and modulation (Release 15)", 3GPP TS 38.211 v15.9.0, (Jun. 2021), 97 pages.
"3rd Generation Partnership Project; Technical Specification Group Radio Access Network; NR; Physical layer procedures for data (Release 15)", 3GPP TS 38.214 v15.13.0, (Jun. 2021), 106 pages.
"3rd Generation Partnership Project; Technical Specification Group Radio Access Network; NR; Radio Resource Control (RRC) protocol specification (Release 15)", 3GPP TS 38.331 v15.14.0, (Jun. 2021), 540 pages.
"3rd Generation Partnership Project; Technical Specification Group Radio Access Network; Terminal conformance specification; Radio transmission and reception (TDD) (Release 11)", 3GPP TS 34.122 v11.10.0, (Mar. 2015), 1122 pages.
Decision to Grant for Chinese Application No. 201680084006.9 dated Sep. 7, 2021, 4 pages.
Decision to Grant for Russian Application No. 2018135482/08 dated Feb. 27, 2020, 15 pages.
Zou et al., "Compensation of Phase Noise in OFDM Wireless Systems", IEEE Transactions on Signal Processing, Vol. 55. No. 11. (Nov. 2007), 18 pages.

(56) References Cited

OTHER PUBLICATIONS

Extended European Search Report for European Application No. 23172111.9 dated Jun. 1, 2023, 11 pages.

* cited by examiner

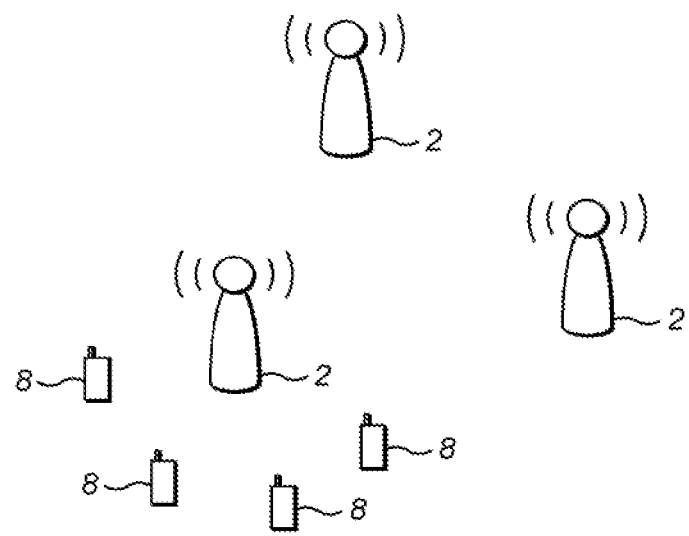
FIG. 1
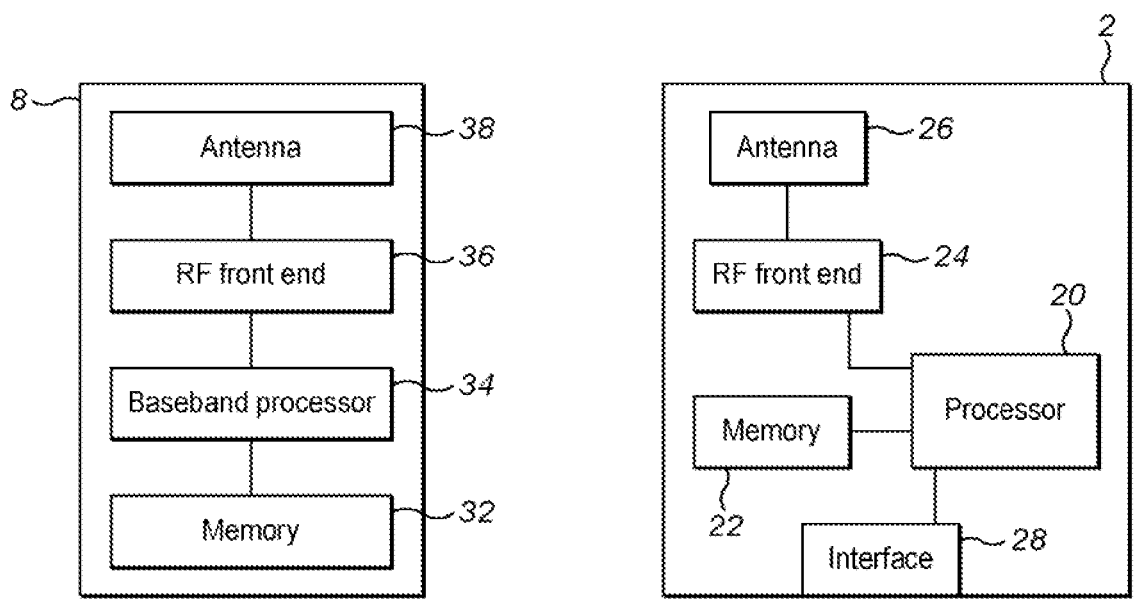
FIG. 2
FIG. 3

COMMON PHASE ERROR AND/OR INTER-CARRIER INTERFERENCE

CROSS-REFERENCE TO RELATED APPLICATIONS

This patent application is a continuation of U.S. Non-Provisional patent application Ser. No. 16/083,032, filed Sep. 7, 2018 and entitled "COMMON PHASE ERROR AND/OR INTER-CARRIER INTERFERENCE," which was a National Phase filing of, and claims the benefit of priority to, International Patent Application Serial No. PCT/FI2016/050184, filed Mar. 23, 2016, the entire disclosures of each of which are hereby incorporated herein by reference in their entireties for all purposes.

TECHNICAL FIELD

The present application relates generally to communication systems, and more particularly to dealing with phase noise and interference experienced between a transmitter and a receiver in communication systems, and still more particularly.

BACKGROUND

Phase noise originating from the oscillator of a transmitting device can cause common phase error and inter-carrier interference in orthogonal frequency division multiplexing (OFDM) communication systems. Such phase noise increases approximately quadratically with carrier frequency, and is therefore particularly an issue for future wireless radio transmission techniques, for which high centimeter wavelength and millimeter wavelength carrier frequencies have been proposed (about 3400 MHz and higher), that are higher than currently used cellular carrier frequencies.

One conventional technique is to use an oscillator that produces less phase noise, but such oscillators can increase the cost of producing transmitting devices such as user equipment (UE), which may or may not have a user interface, and include e.g. high complexity devices such as smartphones etc., low complexity devices such as machine type communication (MTC) devices and other type of devices. Another conventional technique for reducing phase noise for a given oscillator involves increasing the OFDM sub-carrier spacing and reducing the OFDM symbol time period. Problem of this approach is an increased CP overhead leading to reduced spectrum efficiency and achievable peak data rate. On the other hand, shortening the absolute length of the CP can lead to severe performance degradation due to delay spread of the radio channel, particularly when using a multi-user multiple-input-multiple-output (MU-MIMO) technique. The use of Massive MIMO being planned for 5G brings even more challenges, and conventional methods that may work with limited MU-MIMO scenarios, may not work with massive MIMO deployments.

SUMMARY

Described are methods for dealing with phase noise, e.g., common phase error and/or inter-carrier interference, in communication systems, and apparatuses for the same. A method can include at least: transmitting one or more reference signals (in-band signals within a channel); and mapping the reference signals to radio resources in the channel for transmission of the reference signals. An amount of the radio resources may depend on, e.g., information about a modulation and coding scheme used for transmission. An associated method can include at least: receiving one or more reference signals, and mapping the reference signals to radio resources in the channel for reception of the reference signals; receiving information about a modulation and coding scheme to be used, an amount of the radio resources depending on, e.g., information about the modulation and coding scheme used for reception; and using the reference signals to compensate for phase noise.

According to one embodiment, there is provided a method, comprising: transmitting, via radio communication, one or more reference signals for compensation for phase noise, wherein the one or more reference signals are in-band signals within a channel; and mapping the one or more reference signals to selected radio resources in the channel for transmission of the one or more reference signals, wherein an amount of the selected radio resources depends at least on information about a modulation and coding scheme used for the transmission. In some embodiments, said channel comprises a physical uplink shared channel. In some embodiments, the selected radio resources comprise a pre-defined pattern of radio resources in the channel. In some embodiments, the selected radio resources are non-contiguous in frequency.

According to one embodiment, there is provided a method, comprising: receiving, via radio communication, one or more reference signals for compensation for phase noise, wherein the one or more reference signals are in-band signals within a channel, and mapping the one or more reference signals to selected radio resources in the channel for reception of the one or more reference signals; receiving information about a modulation and coding scheme to be used, wherein an amount of the selected radio resources depends at least on the information about the modulation and coding scheme used for reception; and using the one or more reference signals to compensate for phase noise. In some embodiments, said channel comprises a physical downlink shared channel. In some embodiments, the selected radio resources comprise a pre-defined pattern of radio resources in the channel. In some embodiments, the selected radio resources are non-contiguous in frequency.

According to one embodiment, an apparatus can be provided that comprises: at least one processor; and at least one non-transitory memory including computer program code, wherein the memory and computer program code are configured, with the processor, to cause the apparatus to: transmit, via radio communication, one or more reference signals for compensation for phase noise, wherein the one or more reference signals are in-band signals within a channel; and map the one or more reference signals to selected radio resources in the channel for transmission of the one or more reference signals, wherein an amount of the selected radio resources depends at least on information about a modulation and coding scheme used for the transmission. In some embodiments, said channel comprises a physical uplink shared channel. In some embodiments, the selected radio resources comprise a pre-defined pattern of radio resources in the channel. In some embodiments, the selected radio resources are non-contiguous in frequency.

According to one embodiment, an apparatus can be provided that comprises: at least one processor; and at least one non-transitory memory including computer program code, wherein the memory and computer program code are configured, with the processor, to cause the apparatus to: receive, via radio communication, one or more reference signals for compensation for phase noise, wherein the one or more reference signals are in-band signals within a channel, and mapping the one or more reference signals to selected radio resources in the channel for reception of the one or more reference signals; receive information about a modulation and coding scheme to be used, wherein an amount of the selected radio resources depends at least on the information about the modulation and coding scheme used for reception; and use the one or more reference signals to compensate for phase noise. In some embodiments, said channel comprises a physical downlink shared channel. In some embodiments, the selected radio resources comprise a pre-defined pattern of radio resources in the channel. In some embodiments, the selected radio resources are non-contiguous in frequency.

According to one embodiment, a computer program product can be provided that comprises a non-transitory medium storing instructions, wherein said instructions, when executed by a processor, cause at least: transmitting, via radio communication, one or more reference signals for compensation for phase noise, wherein the one or more reference signals are in-band signals within a channel; and mapping the one or more reference signals to selected radio resources in the channel for transmission of the one or more reference signals, wherein an amount of the selected radio resources depends at least on information about a modulation and coding scheme used for the transmission. In some embodiments, said channel comprises a physical uplink shared channel. In some embodiments, the selected radio resources comprise a pre-defined pattern of radio resources in the channel. In some embodiments, the selected radio resources are non-contiguous in frequency.

According to one embodiment, a computer program product can be provided that comprises a non-transitory medium storing instructions, wherein said instructions, when executed by a processor, cause at least: receiving, via radio communication, one or more reference signals for compensation for phase noise, wherein the one or more reference signals are in-band signals within a channel, and mapping the one or more reference signals to selected radio resources in the channel for reception of the one or more reference signals; receiving information about a modulation and coding scheme to be used, wherein an amount of the selected radio resources depends at least on the information about the modulation and coding scheme used for reception; and using the one or more reference signals to compensate for phase noise. In some embodiments, said channel comprises a physical downlink shared channel. In some embodiments, the selected radio resources comprise a pre-defined pattern of radio resources in the channel. In some embodiments, the selected radio resources are non-contiguous in frequency.

According to one embodiment, there is provided an apparatus, the apparatus comprising: means, such as a processor and memory storing computer program code, for carrying out a method such as one or more of those described herein. In some embodiments, the apparatus can comprise: means for transmitting one or more reference signals for compensation for phase noise, wherein the one or more reference signals are in-band signals within a channel; and means for mapping the one or more reference signals to selected radio resources in the channel for transmission of the one or more reference signals, wherein an amount of the selected radio resources depends at least on information about a modulation and coding scheme used for the transmission. In some embodiments, said channel comprises a physical uplink shared channel. In some embodiments, the selected radio resources comprise a pre-defined pattern of radio resources in the channel. In some embodiments, the selected radio resources are non-contiguous in frequency.

According to one embodiment, there is provided an apparatus, the apparatus comprising: means, such as a processor and memory storing computer program code, for carrying out a method such as one or more of those described herein. In some embodiments, the apparatus can comprise: means for receiving one or more reference signals for compensation for phase noise, wherein the one or more reference signals are in-band signals within a channel; means for mapping the one or more reference signals to selected radio resources in the channel for reception of the one or more reference signals; means for receiving information about a modulation and coding scheme to be used, wherein an amount of the selected radio resources depends at least on the information about the modulation and coding scheme used for reception; and means for using the one or more reference signals to compensate for phase noise. In some embodiments, said channel comprises a physical downlink shared channel. In some embodiments, the selected radio resources comprise a pre-defined pattern of radio resources in the channel. In some embodiments, the selected radio resources are non-contiguous in frequency.

According to one embodiment, there is provided a method, comprising: receiving radio transmissions including data and/or control information, and common phase error and/or inter carrier interference correction reference signal, wherein the common phase error and/or inter carrier interference correction reference signal occupies a variable amount of radio resources.

According to one embodiment, said common phase error and/or inter carrier interference correction reference signal is an in-band signal transmitted inside a data and/or control channel for the data and/or control information.

According to one embodiment, the variable amount of radio resources for the common phase error and/or inter carrier interference correction reference signal is selected from at least two amounts: (i) zero radio resources and (ii) one or more radio resources.

According to one embodiment, allocation of radio resources for the common phase error and/or inter carrier interference correction reference signal is performed in one of two ways: (i) resources are non-contiguous in frequency, and (ii) resources are contiguous in frequency.

According to one embodiment, the variable amount and/or contiguousness of radio resources occupied by the common phase error and/or inter carrier interference correction reference signal is dependent on at least one of: at least one property of a data and/or control channel for the data and/or control information; a category of a communication device receiving and/or transmitting the data and/or control information; carrier frequency; and subcarrier spacing.

According to one embodiment, the method further comprises determining, from downlink control information, a structure of the common phase error and/or inter carrier interference correction reference signal to be used for a downlink data transmission from a set of possible structures.

According to one embodiment, the method further comprises determining, from downlink control information a structure of the common phase error and/or inter carrier interference correction reference signal to be used for an uplink data transmission from a set of possible structures.

According to one embodiment, the method further comprises performing common phase error correction and/or inter carrier interference cancellation using the received common phase error and/or inter carrier interference correction reference signal.

According to one embodiment, said receiving is done at a user equipment or a network infrastructure node.

According to one embodiment, said common phase error and/or inter carrier interference correction reference signal occupies one or more sub-carriers over all the symbol time periods allocated to a physical shared channel.

According to one embodiment, said common phase error and/or inter carrier interference correction reference signal is included only when said transmission of said data and/or control information uses a modulation and/or coding scheme having an order of complexity above a predetermined threshold.

According to one embodiment, said common phase error and/or inter carrier interference correction reference signal occupies a predetermined portion of radio resources allocated to the transmission of said data and/or control information.

According to one embodiment, said common phase error and/or inter carrier interference correction reference signal occupies one or more sub-carriers at a predetermined location in the whole of the sub-carriers allocated to the transmission of said data and/or control information.

There is also hereby provided a method, comprising: transmitting data and/or control information; and transmitting common phase error and/or inter carrier interference correction reference signal, wherein said common phase error and/or inter carrier interference correction reference signal occupies a variable amount of radio resources.

According to one embodiment, said common phase error and/or inter carrier interference correction reference signal is an in-band signal transmitted inside a data and/or control channel for said data and/or control information.

According to one embodiment, the variable amount of radio resources for the common phase error and/or inter carrier interference correction reference signal is selected from at least two amounts: (i) zero radio resources and (ii) one or more radio resources.

According to one embodiment, allocation of radio resources for the common phase error and/or inter carrier interference correction reference signal is performed in one of two ways: (i) resources are non-contiguous in frequency, and (ii) resources are contiguous in frequency.

According to one embodiment, the variable amount and/or contiguousness of radio resources occupied by the common phase error and/or inter carrier interference correction reference signal is dependent on at least one of: at least one property of a data and/or control channel for the data and/or control information; a category of a communication device receiving and/or transmitting the data and/or control information; subcarrier frequency; and subcarrier spacing.

According to one embodiment, the common phase error and/or inter carrier interference correction reference signal is transmitted to enable performing common phase error correction and/or inter-carrier interference cancellation by a receiver.

According to one embodiment, the transmitting is done at a user equipment or a network infrastructure node.

According to one embodiment, the method comprises transmitting said common phase error and/or inter carrier interference correction reference signal via one or more sub-carriers over all the symbol time periods allocated to transmission of said data and/or control information.

According to one embodiment, the method comprises transmitting said common phase error and/or inter carrier interference correction reference signal and data and/or control information for a physical shared channel from the same one or more antenna ports.

According to one embodiment, said data and/or control information occupies radio resources shared by a plurality of communication devices according to a spatial multiplexing technique, and the method comprises transmitting said common phase error and/or inter carrier interference correction reference signal for one of said communication devices via radio resources orthogonal to radio resources used for said common phase error and/or inter carrier interference correction reference signal by others of said communication devices.

According to one embodiment, said data and/or control information occupies radio resources shared by a plurality of communication devices according to a spatial multiplexing technique, and the method comprises transmitting said common phase error and/or inter carrier interference correction reference signal for multiple communication devices via the same radio resources.

According to one embodiment, said data and/or control information occupies radio resources shared by a plurality of communication devices according to a spatial multiplexing technique, and the method comprises transmitting said common phase error and/or inter carrier interference correction reference signal for one communication device via a sub-carrier not used for said common phase error and/or inter carrier interference correction reference signal by others of said communication devices.

According to one embodiment, the method comprises: transmitting said common phase error and/or inter carrier interference correction reference signal only when said data and/or control information is transmitted using modulation having an order of complexity above a predetermined threshold.

According to one embodiment, the method comprises: transmitting said common phase error and/or inter carrier interference correction reference signal only when said data and/or control information is transmitted according to a modulation and coding scheme having an order of complexity above a predetermined threshold.

According to one embodiment, the method comprises: transmitting said common phase error and/or inter carrier interference correction reference signal within a predetermined portion of radio resources allocated to said data and/or control information.

According to one embodiment, the method comprises transmitting said common phase error and/or inter carrier interference correction reference signal via one or more sub-carriers at a predetermined location in the whole of the sub-carriers allocated to the transmission of said data and/or control information.

According to one embodiment, an amount and/or presence of radio resources for said common phase error and/or inter carrier interference correction reference signal depends on the modulation and/or coding scheme.

According to one embodiment, an amount and/or presence of radio resources for said common phase error and/or inter carrier interference correction reference signal depends on a capability of a receiver to do inter-carrier interference correction.

According to one embodiment, the method comprises signalling an information indicating the structure of said common phase error and/or inter carrier interference correction reference signal.

According to one embodiment, an amount of radio resources for said common phase error and/or inter carrier interference correction reference signal is selected from the following three amounts:

(i) no radio resources for said common phase error and/or inter carrier interference correction reference signal; (ii) a first number of subcarriers for said common phase error and/or inter carrier interference correction reference signal to enable only CPE correction; and (iii) a second, higher number of subcarriers for said common phase error and/or inter carrier interference correction reference signal to enable both CPE and ICI correction.

According to one embodiment, said common phase error and/or inter carrier interference correction reference signal is present only in a data channel.

There is also hereby provided an apparatus comprising: a processor and memory including computer program code, wherein the memory and computer program code are configured to, with the processor, cause the apparatus to: receive radio transmissions including data and/or control information, and common phase error and/or inter carrier interference correction reference signal, wherein the common phase error and/or inter carrier interference correction reference signal occupies a variable amount of radio resources.

According to one embodiment, said common phase error and/or inter carrier interference correction reference signal is an in-band signal transmitted inside a data and/or control channel for the data and/or control information.

According to one embodiment, the variable amount of radio resources for the common phase error and/or inter carrier interference correction reference signal is selected from at least two amounts: (i) zero radio resources and (ii) one or more radio resources.

According to one embodiment, allocation of radio resources for the common phase error and/or inter carrier interference correction reference signal is performed in one of two ways: (i) resources are non-contiguous in frequency, and (ii) resources are contiguous in frequency.

According to one embodiment, the variable amount and/or contiguousness of radio resources occupied by the common phase error and/or inter carrier interference correction reference signal is dependent on at least one of: at least one property of a data and/or control channel for the data and/or control information; a category of a communication device receiving and/or transmitting the data and/or control information; carrier frequency; and subcarrier spacing.

According to one embodiment, the memory and computer program code are further configured to, with the processor, cause the apparatus to: determine, from downlink control information, a structure of the common phase error and/or inter carrier interference correction reference signal to be used for a downlink data transmission from a set of possible structures.

According to one embodiment, the memory and computer program code are further configured to, with the processor, cause the apparatus to: determine, from downlink control information, a structure of the common phase error and/or inter carrier interference correction reference signal to be used for an uplink data transmission from a set of possible structures.

According to one embodiment, the memory and computer program code are further configured to, with the processor, cause the apparatus to: perform common phase error correction and/or inter carrier interference cancellation using the received common phase error and/or inter carrier interference correction reference signal.

According to one embodiment, said common phase error and/or inter carrier interference correction reference signal occupies one or more sub-carriers over all the symbol time periods allocated to a physical shared channel.

According to one embodiment, said common phase error and/or inter carrier interference correction reference signal is included only when said transmission of said data and/or control information uses a modulation and/or coding scheme having an order of complexity above a predetermined threshold.

According to one embodiment, said common phase error and/or inter carrier interference correction reference signal occupies a predetermined portion of radio resources allocated to the transmission of said data and/or control information.

According to one embodiment, said common phase error and/or inter carrier interference correction reference signal occupies one or more sub-carriers at a predetermined location in the whole of the sub-carriers allocated to the transmission of said data and/or control information.

There is also hereby provided a user equipment or network infrastructure node comprising the apparatus described above.

There is also hereby provided an apparatus comprising: a processor and memory including computer program code, wherein the memory and computer program code are configured to, with the processor, cause the apparatus to: transmit data and/or control information; and transmit common phase error and/or inter carrier interference correction reference signal, wherein said common phase error and/or inter carrier interference correction reference signal occupies a variable amount of radio resources.

According to one embodiment, said common phase error and/or inter carrier interference correction reference signal is an in-band signal transmitted inside a data and/or control channel for said data and/or control information.

According to one embodiment, the variable amount of radio resources for the common phase error and/or inter carrier interference correction reference signal is selected from at least two amounts: (i) zero radio resources and (ii) one or more radio resources.

According to one embodiment, allocation of radio resources for the common phase error and/or inter carrier interference correction reference signal is performed in one of two ways: (i) resources are non-contiguous in frequency, and (ii) resources are contiguous in frequency.

According to one embodiment, the variable amount and/or contiguousness of radio resources occupied by the common phase error and/or inter carrier interference correction reference signal is dependent on at least one of: at least one property of a data and/or control channel for the data and/or control information; a category of a communication device receiving and/or transmitting the data and/or control information; subcarrier frequency; and subcarrier spacing.

According to one embodiment, the common phase error and/or inter carrier interference correction reference signal is transmitted to enable performing common phase error correction and/or inter-carrier interference cancellation by a receiver.

According to one embodiment, the memory and computer program code are further configured to, with the processor, cause the apparatus to: transmit said common phase error and/or inter carrier interference correction reference signal via one or more sub-carriers over all the symbol time periods allocated to transmission of said data and/or control information.

According to one embodiment, the memory and computer program code are further configured to, with the processor, cause the apparatus to: transmit said common phase error and/or inter carrier interference correction reference signal and data and/or control information for a physical shared channel from the same one or more antenna ports.

According to one embodiment, said data and/or control information occupies radio resources shared by a plurality of communication devices according to a spatial multiplexing technique, and the memory and computer program code are further configured to, with the processor, cause the apparatus to: transmit said common phase error and/or inter carrier interference correction reference signal for one of said communication devices via radio resources orthogonal to radio resources used for said common phase error and/or inter carrier interference correction reference signal by others of said communication devices.

According to one embodiment, said data and/or control information occupies radio resources shared by a plurality of communication devices according to a spatial multiplexing technique, and the memory and computer program code are further configured to, with the processor, cause the apparatus to: transmit said common phase error and/or inter carrier interference correction reference signal for multiple communication devices via the same radio resources.

According to one embodiment, said data and/or control information occupies radio resources shared by a plurality of communication devices according to a spatial multiplexing technique, and the memory and computer program code are further configured to, with the processor, cause the apparatus to: transmit said common phase error and/or inter carrier interference correction reference signal for one communication device via a sub-carrier not used for said common phase error and/or inter carrier interference correction reference signal by others of said communication devices.

According to one embodiment, the memory and computer program code are further configured to, with the processor, cause the apparatus to: transmit said common phase error and/or inter carrier interference correction reference signal only when said data and/or control information is transmitted using modulation having an order of complexity above a predetermined threshold.

According to one embodiment, the memory and computer program code are further configured to, with the processor, cause the apparatus to: transmit said common phase error and/or inter carrier interference correction reference signal only when said data and/or control information is transmitted according to a modulation and coding scheme having an order of complexity above a predetermined threshold.

According to one embodiment, the memory and computer program code are further configured to, with the processor, cause the apparatus to: transmit said common phase error and/or inter carrier interference correction reference signal within a predetermined portion of radio resources allocated to said data and/or control information.

According to one embodiment, the memory and computer program code are further configured to, with the processor, cause the apparatus to: transmit said common phase error and/or inter carrier interference correction reference signal via one or more sub-carriers at a predetermined location in the whole of the sub-carriers allocated to the transmission of said data and/or control information.

According to one embodiment, an amount and/or presence of radio resources for said common phase error and/or inter carrier interference correction reference signal depends on the modulation and/or coding scheme.

According to one embodiment, an amount and/or presence of radio resources for said common phase error and/or inter carrier interference correction reference signal depends on a capability of a receiver to do inter-carrier interference correction.

According to one embodiment, the memory and computer program code are further configured to, with the processor, cause the apparatus to: signal an information indicating the structure of said common phase error and/or inter carrier interference correction reference signal.

According to one embodiment, an amount of radio resources for said common phase error and/or inter carrier interference correction reference signal is selected from the following three amounts: (i) no radio resources for said common phase error and/or inter carrier interference correction reference signal; (ii) a first number of subcarriers for said common phase error and/or inter carrier interference correction reference signal to enable only CPE correction; and (iii) a second, higher number of subcarriers for said common phase error and/or inter carrier interference correction reference signal to enable both CPE and ICI correction.

According to one embodiment, said common phase error and/or inter carrier interference correction reference signal is present only in a data channel.

There is also hereby provided a user equipment or network infrastructure node comprising the above apparatus.

There is also hereby provided a computer program product comprising program code means which, when loaded into a computer, controls the computer to: receive radio transmissions including data and/or control information, and common phase error and/or inter carrier interference correction reference signal, wherein the common phase error and/or inter carrier interference correction reference signal occupies a variable amount of radio resources.

There is also hereby provided a computer program product comprising program code means which when loaded into a computer controls the computer to: transmit data and/or control information; and transmit common phase error and/or inter carrier interference correction reference signal, wherein said common phase error and/or inter carrier interference correction reference signal occupies a variable amount of radio resources.

Phase noise is comprised of common phase error (CPE) and random phase error. The random phase error results in inter-carrier interference (ICI).

Certain embodiments of the present invention are related to CPE and/or ICI compensation.

One technique to address compensation of phase noise involves continuously transmitting, from all antenna ports, additional reference signals in the same OFDM symbol time periods of each sub-frame via a consecutive set of OFDM sub-carriers at a predetermined location of the total carrier bandwidth for a cell, which additional reference signals facilitate compensation of phase noise at a receiver (CPE and/or ICI); and using this same set of reference signals at receivers to facilitate compensation of phase noise for all sets of carriers in which radio transmissions are made. This technique can be seen as a single antenna port transmission scheme, and frequency-division-multiplexing (FDM) of transmissions to a plurality of UEs can result in distributed resource allocation within an antenna port, which can cause problems for large carrier bandwidths and hybrid architectures for which distributed power amplifier architecture is typically used. Due to large carrier bandwidth, it may not be possible to use digital pre-distortion to reduce inter-modulation distortion, which would then require transmission power reduction of up to about 10 dB at the transmitter, which reduction can lead to a radical reduction in the geographical coverage of the transmitter. Another method may be to introduce few pilot subcarriers for every OFDMA symbol to facilitate CPE correction. Problem with this approach is however that this structure cannot achieve high performance at high SNR because it is not possible to do ICI compensation.

It is therefore desirable to introduce an adaptive reference signal structure that may address both ICI and CPE compensation depending on the actual needs and not bring too high overhead to the system.

The need for CPE and/or ICI compensation may depend on the SNR. For example, in high SNR environment, providing both ICI compensation and CPE compensation may significantly improve the performance. In medium SNR environment, ICI compensation may not necessarily be needed, since it may introduce performance loss due to sensitivity for noise. In low SNR environment, CPE and ICI compensation may not necessarily be needed, since the performance is limited by thermal noise/interference.

Certain embodiments involve an adaptive reference signal (RS) structure that may address CPE and/or ICI correction (CPE/ICI-RS). The adaptive reference signal presence and/or structure may depend on the used modulation and coding scheme (MCS) of the transmitted data. For example, in the case of higher MCS, the CPE/ICI-RS may occupy more subcarriers, and in the case of lower MCS, the CPE/ICI-RS may occupy less subcarriers. In some embodiments, in the case of very low MCS, the CPE/ICI-RS may not be present at all. The amount of subcarriers occupied by the CPE/ICI-RS may depend on whether both the CPE and ICI correction is needed or whether only CPE correction is needed.

In one non-limiting example, the CPE/ICI-RS may be present only in the data channel. This can be done for example if the MCS of the control part is not very high. In this case ICI compensation may not be needed. Also as the control channel OFDMA symbols contains dedicated reference signal carries, therefore CPE compensation (if needed), can be carried out by normal channel estimation process.

In an example embodiment, CPE/ICI-RS may be present in a predetermined location of data part of the subframe. The presence of CPE/ICI-RS may depend on the MCS scheme. For example, CPE/ICI-RS may be present in case of higher order modulation (e.g. 64 QAM and higher), and CPE/ICI-RS may not be present in the case of lower order modulation. In some embodiments the CPE/ICI-RS occupies a varying number of subcarriers, for example as follows:

No CPE/ICI correction needed if low MCS (e.g. QPSK), therefore RS occupies 0 subcarriers (not present); only CPE correction needed if mid MCS (e.g. 16QAM), therefore RS may occupy only one or a few subcarriers inside xPDSCH/xPUSCH; both CPE and ICE correction needed if high MCS (e.g. 64 QAM or higher), CPE/ICI correction RS will occupy more subcarriers inside xPDSCH/xPUSCH (ICI compensation needs significantly more subcarriers than CPE compensation).

In some embodiments, the amount of resources for CPE/ICI reference signals may depend in addition or alternatively to the schemes described above on the capability of the receiver to do ICI correction.

BRIEF DESCRIPTION OF THE DRAWINGS

Examples of techniques according to embodiments of the invention are described hereunder in detail, by way of example only, with reference to the accompanying drawings, in which:

FIG. 1 illustrates one example of an environment in which embodiments of the present invention may be implemented;

FIG. 2 illustrates one example of apparatus for use at the UEs of FIG. 1;

FIG. 3 illustrates one example of apparatus for use at the eNB of FIG. 1;

DETAILED DESCRIPTION

Figure 4:
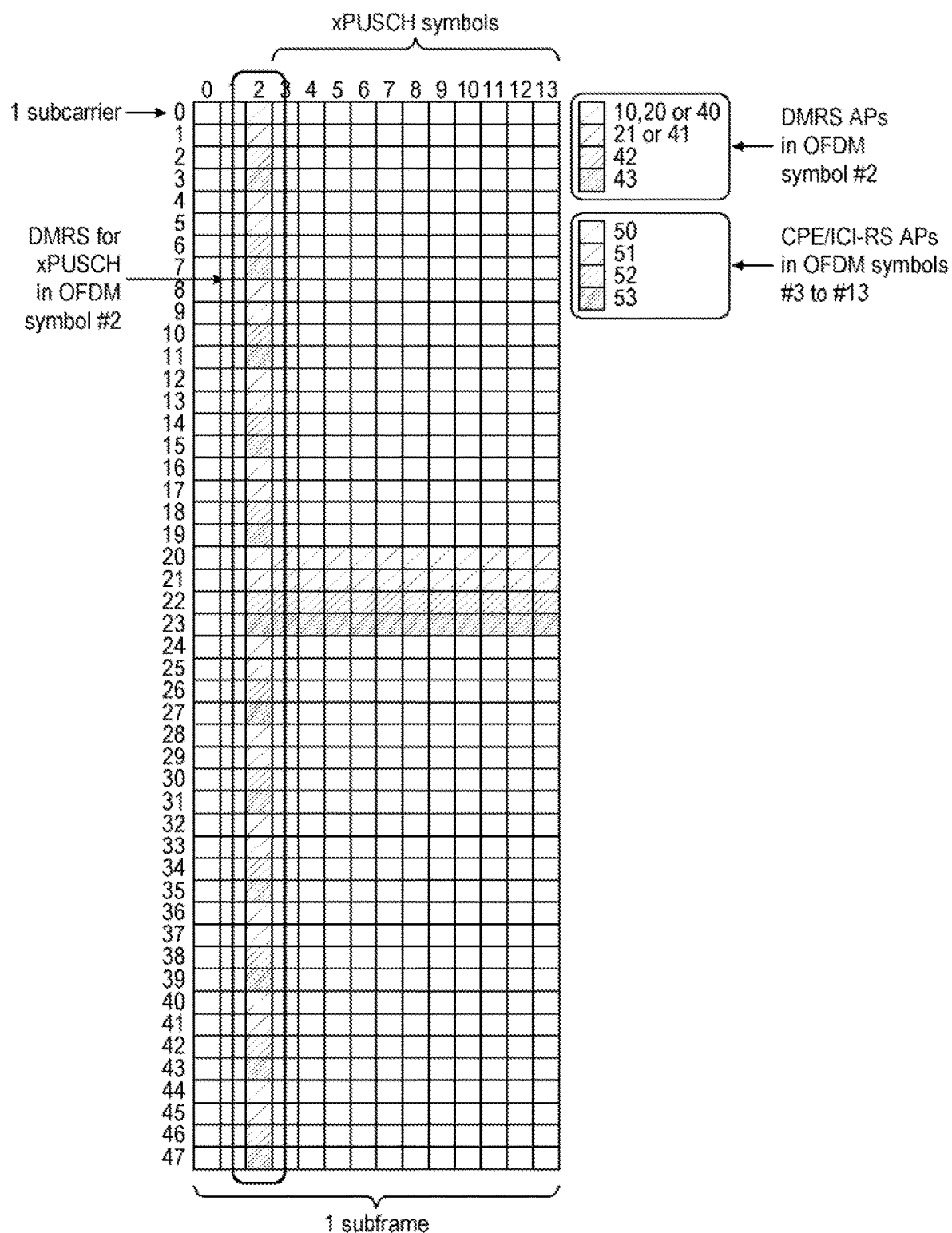
FIG. 4 illustrates one example of configuring CPE/ICI-RS for a set of uplink OFDM radio resources allocated to four spatially multiplexed UEs.

Phase noise originating from the oscillator of a transmitting device can cause common phase error and inter-carrier interference in orthogonal frequency division multiplexing (OFDM) communication systems. Such phase noise increases approximately quadratically with carrier frequency, and is therefore particularly an issue for future wireless radio transmission techniques, for which high centimeter wavelength and millimeter wavelength carrier frequencies have been proposed (about 3400 MHz and higher), that are higher than currently used cellular carrier frequencies.

One conventional technique is to use an oscillator that produces less phase noise, but such oscillators can increase the cost of producing transmitting devices such as user equipment (UE), which may or may not have a user interface, and include e.g. high complexity devices such as smartphones etc., low complexity devices such as machine type communication (MTC) devices and other type of devices. Another conventional technique for reducing phase noise for a given oscillator involves increasing the OFDM sub-carrier spacing and reducing the OFDM symbol time period. Problem of this approach is an increased CP overhead leading to reduced spectrum efficiency and achievable peak data rate. On the other hand, shortening the absolute length of the CP can lead to severe performance degradation due to delay spread of the radio channel, particularly when using a multi-user multiple-input-multiple-output (MU-MIMO) technique. The use of Massive MIMO being planned for 5G brings even more challenges, and conventional methods that may work with limited MU-MIMO scenarios, may not work with massive MIMO deployments.

The inventors for the present application have identified a need for a different technique for dealing with phase noise in OFDM systems.

Described are methods for dealing with phase noise, e.g., common phase error and/or inter-carrier interference, in communication systems, and apparatuses for the same. A method can include at least: transmitting one or more reference signals (in-band signals within a channel); and mapping the reference signals to radio resources in the channel for transmission of the reference signals. An amount of the radio resources may depend on, e.g., information about a modulation and coding scheme used for transmission. An associated method can include at least: receiving one or more reference signals, and mapping the reference signals to radio resources in the channel for reception of the reference signals; receiving information about a modulation and coding scheme to be used, an amount of the radio resources depending on, e.g., information about the modulation and coding scheme used for reception; and using the reference signals to compensate for phase noise.

According to one embodiment, there is provided a method, comprising: transmitting, via radio communication, one or more reference signals for compensation for phase noise, wherein the one or more reference signals are in-band signals within a channel; and mapping the one or more reference signals to selected radio resources in the channel for transmission of the one or more reference signals, wherein an amount of the selected radio resources depends at least on information about a modulation and coding scheme used for the transmission. In some embodiments, said channel comprises a physical uplink shared channel. In some embodiments, the selected radio resources comprise a pre-defined pattern of radio resources in the channel. In some embodiments, the selected radio resources are non-contiguous in frequency.

According to one embodiment, there is provided a method, comprising: receiving, via radio communication, one or more reference signals for compensation for phase noise, wherein the one or more reference signals are in-band signals within a channel, and mapping the one or more reference signals to selected radio resources in the channel for reception of the one or more reference signals; receiving information about a modulation and coding scheme to be used, wherein an amount of the selected radio resources depends at least on the information about the modulation and coding scheme used for reception; and using the one or more reference signals to compensate for phase noise. In some embodiments, said channel comprises a physical downlink shared channel. In some embodiments, the selected radio resources comprise a pre-defined pattern of radio resources in the channel. In some embodiments, the selected radio resources are non-contiguous in frequency.

According to one embodiment, an apparatus can be provided that comprises: at least one processor; and at least one non-transitory memory including computer program code, wherein the memory and computer program code are configured, with the processor, to cause the apparatus to: transmit, via radio communication, one or more reference signals for compensation for phase noise, wherein the one or more reference signals are in-band signals within a channel; and map the one or more reference signals to selected radio resources in the channel for transmission of the one or more reference signals, wherein an amount of the selected radio resources depends at least on information about a modulation and coding scheme used for the transmission. In some embodiments, said channel comprises a physical uplink shared channel. In some embodiments, the selected radio resources comprise a pre-defined pattern of radio resources in the channel. In some embodiments, the selected radio resources are non-contiguous in frequency.

According to one embodiment, an apparatus can be provided that comprises: at least one processor; and at least one non-transitory memory including computer program code, wherein the memory and computer program code are configured, with the processor, to cause the apparatus to: receive, via radio communication, one or more reference signals for compensation for phase noise, wherein the one or more reference signals are in-band signals within a channel, and mapping the one or more reference signals to selected radio resources in the channel for reception of the one or more reference signals; receive information about a modulation and coding scheme to be used, wherein an amount of the selected radio resources depends at least on the information about the modulation and coding scheme used for reception; and use the one or more reference signals to compensate for phase noise. In some embodiments, said channel comprises a physical downlink shared channel. In some embodiments, the selected radio resources comprise a pre-defined pattern of radio resources in the channel. In some embodiments, the selected radio resources are non-contiguous in frequency.

According to one embodiment, a computer program product can be provided that comprises a non-transitory medium storing instructions, wherein said instructions, when executed by a processor, cause at least: transmitting, via radio communication, one or more reference signals for compensation for phase noise, wherein the one or more reference signals are in-band signals within a channel; and mapping the one or more reference signals to selected radio resources in the channel for transmission of the one or more reference signals, wherein an amount of the selected radio resources depends at least on information about a modulation and coding scheme used for the transmission. In some embodiments, said channel comprises a physical uplink shared channel. In some embodiments, the selected radio resources comprise a pre-defined pattern of radio resources in the channel. In some embodiments, the selected radio resources are non-contiguous in frequency.

According to one embodiment, a computer program product can be provided that comprises a non-transitory medium storing instructions, wherein said instructions, when executed by a processor, cause at least: receiving, via radio communication, one or more reference signals for compensation for phase noise, wherein the one or more reference signals are in-band signals within a channel, and mapping the one or more reference signals to selected radio resources in the channel for reception of the one or more reference signals; receiving information about a modulation and coding scheme to be used, wherein an amount of the selected radio resources depends at least on the information about the modulation and coding scheme used for reception; and using the one or more reference signals to compensate for phase noise. In some embodiments, said channel comprises a physical downlink shared channel. In some embodiments, the selected radio resources comprise a pre-defined pattern of radio resources in the channel. In some embodiments, the selected radio resources are non-contiguous in frequency.

According to one embodiment, there is provided an apparatus, the apparatus comprising: means, such as a processor and memory storing computer program code, for carrying out a method such as one or more of those described herein. In some embodiments, the apparatus can comprise: means for transmitting one or more reference signals for compensation for phase noise, wherein the one or more reference signals are in-band signals within a channel; and means for mapping the one or more reference signals to selected radio resources in the channel for transmission of the one or more reference signals, wherein an amount of the selected radio resources depends at least on information about a modulation and coding scheme used for the transmission. In some embodiments, said channel comprises a physical uplink shared channel. In some embodiments, the selected radio resources comprise a pre-defined pattern of radio resources in the channel. In some embodiments, the selected radio resources are non-contiguous in frequency.

According to one embodiment, there is provided an apparatus, the apparatus comprising: means, such as a processor and memory storing computer program code, for carrying out a method such as one or more of those described herein. In some embodiments, the apparatus can comprise: means for receiving one or more reference signals for compensation for phase noise, wherein the one or more reference signals are in-band signals within a channel; means for mapping the one or more reference signals to selected radio resources in the channel for reception of the one or more reference signals; means for receiving information about a modulation and coding scheme to be used, wherein an amount of the selected radio resources depends at least on the information about the modulation and coding scheme used for reception; and means for using the one or more reference signals to compensate for phase noise. In some embodiments, said channel comprises a physical downlink shared channel. In some embodiments, the selected radio resources comprise a pre-defined pattern of radio resources in the channel. In some embodiments, the selected radio resources are non-contiguous in frequency.

According to one embodiment, a method can be provided or carried out, the method comprising: receiving radio transmissions including data and/or control information, and common phase error and/or inter carrier interference correction reference signal, wherein the common phase error and/or inter carrier interference correction reference signal occupies a variable amount of radio resources.

According to one embodiment, said common phase error and/or inter carrier interference correction reference signal is an in-band signal transmitted inside a data and/or control channel for the data and/or control information.

According to one embodiment, the variable amount of radio resources for the common phase error and/or inter carrier interference correction reference signal is selected from at least two amounts: (i) zero radio resources and (ii) one or more radio resources.

According to one embodiment, allocation of radio resources for the common phase error and/or inter carrier interference correction reference signal is performed in one of two ways: (i) resources are non-contiguous in frequency, and (ii) resources are contiguous in frequency.

According to one embodiment, the variable amount and/or contiguousness of radio resources occupied by the common phase error and/or inter carrier interference correction reference signal is dependent on at least one of: at least one property of a data and/or control channel for the data and/or control information; a category of a communication device receiving and/or transmitting the data and/or control information; carrier frequency; and subcarrier spacing.

According to one embodiment, the method further comprises determining, from downlink control information, a structure of the common phase error and/or inter carrier interference correction reference signal to be used for a downlink data transmission from a set of possible structures.

According to one embodiment, the method further comprises determining, from downlink control information a structure of the common phase error and/or inter carrier interference correction reference signal to be used for an uplink data transmission from a set of possible structures.

According to one embodiment, the method further comprises performing common phase error correction and/or inter carrier interference cancellation using the received common phase error and/or inter carrier interference correction reference signal.

According to one embodiment, said receiving is done at a user equipment or a network infrastructure node.

According to one embodiment, said common phase error and/or inter carrier interference correction reference signal occupies one or more sub-carriers over all the symbol time periods allocated to a physical shared channel.

According to one embodiment, said common phase error and/or inter carrier interference correction reference signal is included only when said transmission of said data and/or control information uses a modulation and/or coding scheme having an order of complexity above a predetermined threshold.

According to one embodiment, said common phase error and/or inter carrier interference correction reference signal occupies a predetermined portion of radio resources allocated to the transmission of said data and/or control information.

According to one embodiment, said common phase error and/or inter carrier interference correction reference signal occupies one or more sub-carriers at a predetermined location in the whole of the sub-carriers allocated to the transmission of said data and/or control information.

There is also hereby provided a method, comprising: transmitting data and/or control information; and transmitting common phase error and/or inter carrier interference correction reference signal, wherein said common phase error and/or inter carrier interference correction reference signal occupies a variable amount of radio resources.

According to one embodiment, said common phase error and/or inter carrier interference correction reference signal is an in-band signal transmitted inside a data and/or control channel for said data and/or control information.

According to one embodiment, the variable amount of radio resources for the common phase error and/or inter carrier interference correction reference signal is selected from at least two amounts: (i) zero radio resources and (ii) one or more radio resources.

According to one embodiment, allocation of radio resources for the common phase error and/or inter carrier interference correction reference signal is performed in one of two ways: (i) resources are non-contiguous in frequency, and (ii) resources are contiguous in frequency.

According to one embodiment, the variable amount and/or contiguousness of radio resources occupied by the common phase error and/or inter carrier interference correction reference signal is dependent on at least one of: at least one property of a data and/or control channel for the data and/or control information; a category of a communication device receiving and/or transmitting the data and/or control information; subcarrier frequency; and subcarrier spacing.

According to one embodiment, the common phase error and/or inter carrier interference correction reference signal is transmitted to enable performing common phase error correction and/or inter-carrier interference cancellation by a receiver.

According to one embodiment, the transmitting is done at a user equipment or a network infrastructure node.

According to one embodiment, the method comprises transmitting said common phase error and/or inter carrier interference correction reference signal via one or more sub-carriers over all the symbol time periods allocated to transmission of said data and/or control information.

According to one embodiment, the method comprises transmitting said common phase error and/or inter carrier interference correction reference signal and data and/or control information for a physical shared channel from the same one or more antenna ports.

According to one embodiment, said data and/or control information occupies radio resources shared by a plurality of communication devices according to a spatial multiplexing technique, and the method comprises transmitting said common phase error and/or inter carrier interference correction reference signal for one of said communication devices via radio resources orthogonal to radio resources used for said common phase error and/or inter carrier interference correction reference signal by others of said communication devices.

According to one embodiment, said data and/or control information occupies radio resources shared by a plurality of communication devices according to a spatial multiplexing technique, and the method comprises transmitting said common phase error and/or inter carrier interference correction reference signal for multiple communication devices via the same radio resources.

According to one embodiment, said data and/or control information occupies radio resources shared by a plurality of communication devices according to a spatial multiplexing technique, and the method comprises transmitting said common phase error and/or inter carrier interference correction reference signal for one communication device via a sub-carrier not used for said common phase error and/or inter carrier interference correction reference signal by others of said communication devices.

According to one embodiment, the method comprises: transmitting said common phase error and/or inter carrier interference correction reference signal only when said data and/or control information is transmitted using modulation having an order of complexity above a predetermined threshold.

According to one embodiment, the method comprises: transmitting said common phase error and/or inter carrier interference correction reference signal only when said data and/or control information is transmitted according to a modulation and coding scheme having an order of complexity above a predetermined threshold.

According to one embodiment, the method comprises: transmitting said common phase error and/or inter carrier interference correction reference signal within a predetermined portion of radio resources allocated to said data and/or control information.

According to one embodiment, the method comprises transmitting said common phase error and/or inter carrier interference correction reference signal via one or more sub-carriers at a predetermined location in the whole of the sub-carriers allocated to the transmission of said data and/or control information.

According to one embodiment, an amount and/or presence of radio resources for said common phase error and/or inter carrier interference correction reference signal depends on the modulation and/or coding scheme.

According to one embodiment, an amount and/or presence of radio resources for said common phase error and/or inter carrier interference correction reference signal depends on a capability of a receiver to do inter-carrier interference correction. According to one embodiment, the method comprises signalling an information indicating the structure of said common phase error and/or inter carrier interference correction reference signal.

According to one embodiment, an amount of radio resources for said common phase error and/or inter carrier interference correction reference signal is selected from the following three amounts:

(i) no radio resources for said common phase error and/or inter carrier interference correction reference signal;

(ii) a first number of subcarriers for said common phase error and/or inter carrier interference correction reference signal to enable only CPE correction; and (iii) a second, higher number of subcarriers for said common phase error and/or inter carrier interference correction reference signal to enable both CPE and ICI correction.

According to one embodiment, said common phase error and/or inter carrier interference correction reference signal is present only in a data channel.

There is also hereby provided an apparatus comprising: a processor and memory including computer program code, wherein the memory and computer program code are configured to, with the processor, cause the apparatus to: receive radio transmissions including data and/or control information, and common phase error and/or inter carrier interference correction reference signal, wherein the common phase error and/or inter carrier interference correction reference signal occupies a variable amount of radio resources.

According to one embodiment, said common phase error and/or inter carrier interference correction reference signal is an in-band signal transmitted inside a data and/or control channel for the data and/or control information.

According to one embodiment, the variable amount of radio resources for the common phase error and/or inter carrier interference correction reference signal is selected from at least two amounts: (i) zero radio resources and (ii) one or more radio resources.

According to one embodiment, allocation of radio resources for the common phase error and/or inter carrier interference correction reference signal is performed in one of two ways: (i) resources are non-contiguous in frequency, and (ii) resources are contiguous in frequency.

According to one embodiment, the variable amount and/or contiguousness of radio resources occupied by the common phase error and/or inter carrier interference correction reference signal is dependent on at least one of: at least one property of a data and/or control channel for the data and/or control information; a category of a communication device receiving and/or transmitting the data and/or control information; carrier frequency; and subcarrier spacing.

According to one embodiment, the memory and computer program code are further configured to, with the processor, cause the apparatus to: determine, from downlink control information, a structure of the common phase error and/or inter carrier interference correction reference signal to be used for a downlink data transmission from a set of possible structures.

According to one embodiment, the memory and computer program code are further configured to, with the processor, cause the apparatus to: determine, from downlink control information, a structure of the common phase error and/or inter carrier interference correction reference signal to be used for an uplink data transmission from a set of possible structures.

According to one embodiment, the memory and computer program code are further configured to, with the processor, cause the apparatus to: perform common phase error correction and/or inter carrier interference cancellation using the received common phase error and/or inter carrier interference correction reference signal.

According to one embodiment, said common phase error and/or inter carrier interference correction reference signal occupies one or more sub-carriers over all the symbol time periods allocated to a physical shared channel.

According to one embodiment, said common phase error and/or inter carrier interference correction reference signal is included only when said transmission of said data and/or control information uses a modulation and/or coding scheme having an order of complexity above a predetermined threshold.

According to one embodiment, said common phase error and/or inter carrier interference correction reference signal occupies a predetermined portion of radio resources allocated to the transmission of said data and/or control information.

According to one embodiment, said common phase error and/or inter carrier interference correction reference signal occupies one or more sub-carriers at a predetermined location in the whole of the sub-carriers allocated to the transmission of said data and/or control information.

There is also hereby provided a user equipment or network infrastructure node comprising the apparatus described above.

There is also hereby provided an apparatus comprising: a processor and memory including computer program code, wherein the memory and computer program code are configured to, with the processor, cause the apparatus to: transmit data and/or control information; and transmit common phase error and/or inter carrier interference correction reference signal, wherein said common phase error and/or inter carrier interference correction reference signal occupies a variable amount of radio resources.

According to one embodiment, said common phase error and/or inter carrier interference correction reference signal is an in-band signal transmitted inside a data and/or control channel for said data and/or control information.

According to one embodiment, the variable amount of radio resources for the common phase error and/or inter carrier interference correction reference signal is selected from at least two amounts: (i) zero radio resources and (ii) one or more radio resources.

According to one embodiment, allocation of radio resources for the common phase error and/or inter carrier interference correction reference signal is performed in one of two ways: (i) resources are non-contiguous in frequency, and (ii) resources are contiguous in frequency.

According to one embodiment, the variable amount and/or contiguousness of radio resources occupied by the common phase error and/or inter carrier interference correction reference signal is dependent on at least one of: at least one property of a data and/or control channel for the data and/or control information; a category of a communication device receiving and/or transmitting the data and/or control information; subcarrier frequency; and subcarrier spacing.

According to one embodiment, the common phase error and/or inter carrier interference correction reference signal is transmitted to enable performing common phase error correction and/or inter-carrier interference cancellation by a receiver.

According to one embodiment, the memory and computer program code are further configured to, with the processor, cause the apparatus to: transmit said common phase error and/or inter carrier interference correction reference signal via one or more sub-carriers over all the symbol time periods allocated to transmission of said data and/or control information.

According to one embodiment, the memory and computer program code are further configured to, with the processor, cause the apparatus to: transmit said common phase error and/or inter carrier interference correction reference signal and data and/or control information for a physical shared channel from the same one or more antenna ports.

According to one embodiment, said data and/or control information occupies radio resources shared by a plurality of communication devices according to a spatial multiplexing technique, and the memory and computer program code are further configured to, with the processor, cause the apparatus to: transmit said common phase error and/or inter carrier interference correction reference signal for one of said communication devices via radio resources orthogonal to radio resources used for said common phase error and/or inter carrier interference correction reference signal by others of said communication devices.

According to one embodiment, said data and/or control information occupies radio resources shared by a plurality of communication devices according to a spatial multiplexing technique, and the memory and computer program code are further configured to, with the processor, cause the apparatus to: transmit said common phase error and/or inter carrier interference correction reference signal for multiple communication devices via the same radio resources.

According to one embodiment, said data and/or control information occupies radio resources shared by a plurality of communication devices according to a spatial multiplexing technique, and the memory and computer program code are further configured to, with the processor, cause the apparatus to: transmit said common phase error and/or inter carrier interference correction reference signal for one communication device via a sub-carrier not used for said common phase error and/or inter carrier interference correction reference signal by others of said communication devices.

According to one embodiment, the memory and computer program code are further configured to, with the processor, cause the apparatus to: transmit said common phase error and/or inter carrier interference correction reference signal only when said data and/or control information is transmitted using modulation having an order of complexity above a predetermined threshold.

According to one embodiment, the memory and computer program code are further configured to, with the processor, cause the apparatus to: transmit said common phase error and/or inter carrier interference correction reference signal only when said data and/or control information is transmitted according to a modulation and coding scheme having an order of complexity above a predetermined threshold.

According to one embodiment, the memory and computer program code are further configured to, with the processor, cause the apparatus to: transmit said common phase error and/or inter carrier interference correction reference signal within a predetermined portion of radio resources allocated to said data and/or control information.

According to one embodiment, the memory and computer program code are further configured to, with the processor, cause the apparatus to: transmit said common phase error and/or inter carrier interference correction reference signal via one or more sub-carriers at a predetermined location in the whole of the sub-carriers allocated to the transmission of said data and/or control information.

According to one embodiment, an amount and/or presence of radio resources for said common phase error and/or inter carrier interference correction reference signal depends on the modulation and/or coding scheme.

According to one embodiment, an amount and/or presence of radio resources for said common phase error and/or inter carrier interference correction reference signal depends on a capability of a receiver to do inter-carrier interference correction.

According to one embodiment, the memory and computer program code are further configured to, with the processor, cause the apparatus to: signal an information indicating the structure of said common phase error and/or inter carrier interference correction reference signal.

According to one embodiment, an amount of radio resources for said common phase error and/or inter carrier interference correction reference signal is selected from the following three amounts: (i) no radio resources for said common phase error and/or inter carrier interference correction reference signal; (ii) a first number of subcarriers for said common phase error and/or inter carrier interference correction reference signal to enable only CPE correction; and (iii) a second, higher number of subcarriers for said common phase error and/or inter carrier interference correction reference signal to enable both CPE and ICI correction.

According to one embodiment, said common phase error and/or inter carrier interference correction reference signal is present only in a data channel.

There is also hereby provided a user equipment or network infrastructure node comprising the above apparatus.

There is also hereby provided a computer program product comprising program code means which, when loaded into a computer, controls the computer to: receive radio transmissions including data and/or control information, and common phase error and/or inter carrier interference correction reference signal, wherein the common phase error and/or inter carrier interference correction reference signal occupies a variable amount of radio resources.

There is also hereby provided a computer program product comprising program code means which when loaded into a computer controls the computer to: transmit data and/or control information; and transmit common phase error and/or inter carrier interference correction reference signal, wherein said common phase error and/or inter carrier interference correction reference signal occupies a variable amount of radio resources.

Phase noise is comprised of common phase error (CPE) and random phase error. The random phase error results in inter-carrier interference (ICI).

Certain embodiments of the present invention are related to CPE and/or ICI compensation.

One technique to address compensation of phase noise involves continuously transmitting, from all antenna ports, additional reference signals in the same OFDM symbol time periods of each sub-frame via a consecutive set of OFDM sub-carriers at a predetermined location of the total carrier bandwidth for a cell, which additional reference signals facilitate compensation of phase noise at a receiver (CPE and/or ICI); and using this same set of reference signals at receivers to facilitate compensation of phase noise for all sets of carriers in which radio transmissions are made. This technique can be seen as a single antenna port transmission scheme, and frequency-division-multiplexing (FDM) of transmissions to a plurality of UEs can result in distributed resource allocation within an antenna port, which can cause problems for large carrier bandwidths and hybrid architectures for which distributed power amplifier architecture is typically used. Due to large carrier bandwidth, it may not be possible to use digital pre-distortion to reduce inter-modulation distortion, which would then require transmission power reduction of up to about 10 dB at the transmitter, which reduction can lead to a radical reduction in the geographical coverage of the transmitter. Another method may be to introduce few pilot subcarriers for every OFDMA symbol to facilitate CPE correction. Problem with this approach is however that this structure cannot achieve high performance at high SNR because it is not possible to do ICI compensation.

It is therefore desirable to introduce an adaptive reference signal structure that may address both ICI and CPE compensation depending on the actual needs and not bring too high overhead to the system.

The need for CPE and/or ICI compensation may depend on the SNR. For example, in high SNR environment, providing both ICI compensation and CPE compensation may significantly improve the performance. In medium SNR environment, ICI compensation may not necessarily be needed, since it may introduce performance loss due to sensitivity for noise. In low SNR environment, CPE and ICI compensation may not necessarily be needed, since the performance is limited by thermal noise/interference.

Certain embodiments involve an adaptive reference signal (RS) structure that may address CPE and/or ICI correction (CPE/ICI-RS). The adaptive reference signal presence and/or structure may depend on the used modulation and coding scheme (MCS) of the transmitted data. For example, in the case of higher MCS, the CPE/ICI-RS may occupy more subcarriers, and in the case of lower MCS, the CPE/ICI-RS may occupy less subcarriers. In some embodiments, in the case of very low MCS, the CPE/ICI-RS may not be present at all. The amount of subcarriers occupied by the CPE/ICI-RS may depend on whether both the CPE and ICI correction is needed or whether only CPE correction is needed.

In one non-limiting example, the CPE/ICI-RS may be present only in the data channel. This can be done for example if the MCS of the control part is not very high. In this case ICI compensation may not be needed. Also as the control channel OFDMA symbols contains dedicated reference signal carries, therefore CPE compensation (if needed), can be carried out by normal channel estimation process.

In an example embodiment, CPE/ICI-RS may be present in a predetermined location of data part of the subframe. The presence of CPE/ICI-RS may depend on the MCS scheme. For example, CPE/ICI-RS may be present in case of higher order modulation (e.g. 64 QAM and higher), and CPE/ICI-RS may not be present in the case of lower order modulation. In some embodiments the CPE/ICI-RS occupies a varying number of subcarriers, for example as follows:

No CPE/ICI correction needed if low MCS (e.g. QPSK), therefore RS occupies 0 subcarriers (not present); only CPE correction needed if mid MCS (e.g. 16QAM), therefore RS may occupy only one or a few subcarriers inside xPDSCH/xPUSCH; both CPE and ICE correction needed if high MCS (e.g. 64 QAM or higher), CPE/ICI correction RS will occupy more subcarriers inside xPDSCH/xPUSCH (ICI compensation needs significantly more subcarriers than CPE compensation).

In some embodiments, the amount of resources for CPE/ICI reference signals may depend in addition or alternatively to the schemes described above on the capability of the receiver to do ICI correction.

A technique according to an embodiment of the present invention is described in detail below for one example of a communication system based on the division of radio resources into blocks of 14 OFDM symbol time periods, but the same technique is applicable to other communication systems.

FIG. 1 schematically shows an example of four user equipment (UE; for example, high complexity devices such as smartphones etc. low complexity devices such as MTC devices or any other type of wireless communication device) 8 located within the coverage area of a cell operated by a wireless network infrastructure node (wireless access point, eNB and the like) 2 belonging to a radio access network. FIG. 1 illustrates the example of eNBs as cell nodes; however, it should be understood that instead of eNB there can be any other type of wireless infrastructure nodes. Furthermore, FIG. 1 only shows a small number of eNBs, but a radio access network typically comprises a large number of eNBs each operating one or more cells.

Each eNB 2 of a radio access network is typically connected to one or more core network entities and/or a mobile management entity etc., but these other entities are omitted from FIG. 1 for conciseness.

FIG. 2 shows a schematic view of an example of apparatus for each UE 8. The UE 8 may be used for various tasks such as making and receiving phone calls, receiving and sending data from and to a data network, and experiencing, for example, multimedia or other content. The UE 8 may be any device at least capable of both recovering data/information from radio transmissions made by the eNB 2, and making radio transmissions from which data/information is recoverable by the eNB 2. Non-limiting examples of user equipment (UE) 8 include smartphones, tablets, personal computers, and devices without any user interface, such as devices that are designed for machine type communications (MTC).

With reference to FIG. 2, a baseband processor 34, operating in accordance with program code stored at memory 32, controls the generation and transmission of radio signals via radio-frequency (RF) front end 36 and antenna 38. The RF front end 36 may include an analogue transceiver, filters, a duplexer, and antenna switch. Also, the combination of antenna 38, RF front end 36 and baseband processor 34 recovers data/information from radio signals reaching UE 8 from e.g. eNB 2. The UE 8 may also comprise an application processor (not shown) that generates user data for transmission via radio signals, and processes user data recovered from radio signals by baseband processor 34 and stored at memory 32.

The application processor and the baseband processor 34 may be implemented as separate chips or combined into a single chip. The memory 32 may be implemented as one or more chips. The memory 32 may include both read-only memory and random-access memory. The above elements may be provided on one or more circuit boards.

The UE may include additional other elements not shown in FIG. 2. For example, the UE 8 may include a user interface such as a key pad, voice command recognition device, touch sensitive screen or pad, combinations thereof or the like, via which a user may control operation of the UE 8. The UE 8 may also include a display, a speaker and a microphone. Furthermore, the UE 8 may comprise appropriate connectors (either wired or wireless) to other devices and/or for connecting external accessories (e.g. hands-free equipment) thereto.

FIG. 3 shows an example of apparatus for use at the eNB 2 of FIG. 1. A broadband processor 20, operating in accordance with program code stored at memory 22, (a) controls the generation and transmission of radio signals via the combination of RF front end 24 and antenna 26; and (b) recovers data from radio signals reaching the eNB from e.g. UEs 8. The RF front end may include an analogue transceiver, filters, a duplexer, and antenna switch. Both the processor 20 and the memory 22 may be implemented as one or more chips. The memory 22 may include both read-only memory and random-access memory. The above elements may be provided on one or more circuit boards. The apparatus also comprises an interface 28 for transferring data to and from one or more other entities such as e.g. core network entities, mobile management entities, and other eNBs in the same access network.

It should be appreciated that the apparatus shown in each of FIGS. 2 and 3 described above may comprise further elements which are not directly involved with the embodiments of the invention described hereafter.

Figure 7:
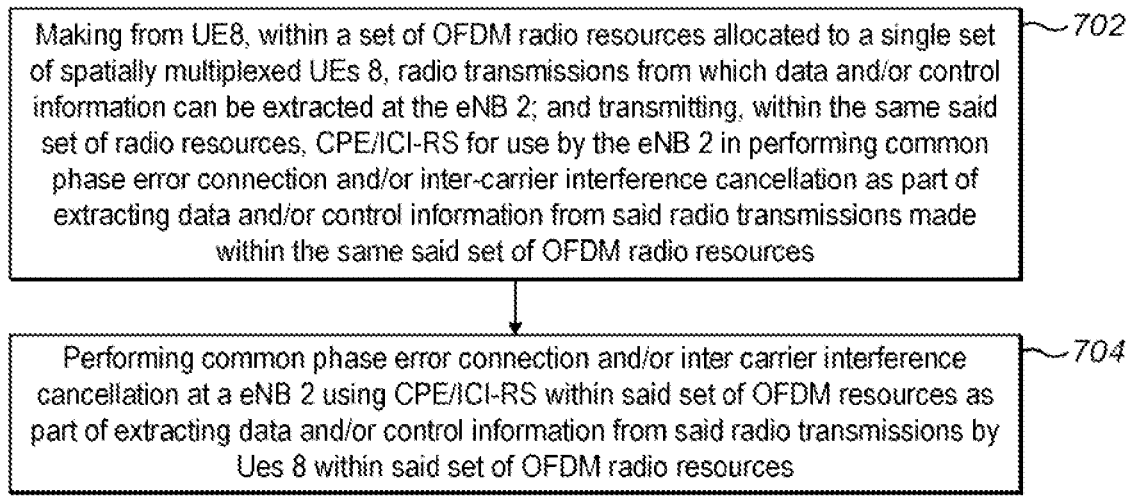
FIG. 7 illustrates one example of a set of uplink operations at eNB and a UE according to an embodiment of the present invention.

FIG. 7 illustrates an example of uplink operations at UE 8 and eNB 2 according to one embodiment.

All operations carried out by the UE processor 34 follow program code stored at UE memory 32; and all operations carried out by the eNB processor 20 follow program code stored at eNB memory 22.

With additional reference to FIG. 4, a set of OFDM time-frequency resources for a cell operated by eNB 2 is assigned to uplink transmissions by e.g. four spatially multiplexed UEs 8. The set of OFDM resources is defined by a combination of: (i) in the frequency domain, a sub-set of e.g. 48 OFDM sub-carriers (e.g. #0 to #47) within the larger number of total OFDM subcarriers for the cell, and (ii) in the time domain, a specific sub-frame comprising 14 OFDM symbol time periods (also referred to simply as OFDM symbols). As shown in FIG. 4, OFDM symbol #2 is used for demodulation reference signals (DMRS), and OFDM symbols #3 to #13 are allocated to a physical uplink shared channel (e.g. xPUSCH to use the terminology adopted for $5^{th}$ generation (5G) systems). As mentioned above, FIG. 4 illustrates one non-limiting example of how to multiplex the data and reference signals, and one non-limiting example of a radio resource structure.

The UE baseband processor 34 at each of the four spatially multiplexed (according to a MU-MIMO technique) UEs 8 to which the set of OFDM radio resources of FIG. 4 is commonly allocated, makes xPUSCH radio transmissions (via front end 36 and antenna 38) on OFDM symbol time periods #3 to #13 from which eNB 2 can extract data and/or control information, and includes within the same group of OFDM symbols #3 to #13 CPE/ICI-RS (Common Phase Error/Inter Carrier Interference Reference Signals) via a respective one of a set of 4 consecutive OFDM subcarriers at a predetermined location within the whole sub-set of 48 OFDM subcarriers (STEP 702 of FIG. 7).

The CPE/ICI-RS are used by a receiver (i.e. eNB 2) to correct and compensate for common phase error and/or inter-carrier interference as part of the process of extracting xPUSCH data from the radio transmissions within OFDM symbols #3 to #13. The xPUSCH data is rate matched or punctured around the CPE/ICI-RS. The location of the set of 4 consecutive subcarriers for CPE/ICI-RS is known to the eNB 2, and the eNB 2 can also derive information about how the set of 4 consecutive subcarriers are shared amongst the 4 spatially multiplexed UEs 8 from the indicated DMRS index. The use of mutually orthogonal resources for the CPE/ICI-RS for each of the 4 UEs (i.e. in this example, the use of a respective, dedicated OFDM sub-carrier for the CPE/ICI-RS for each of the 4 spatially multiplexed UEs) allows the eNB 2 to perform CPE/ICI correction independently for each of the four UEs 8, thereby supporting MU-MIMO for the uplink.

As discussed in more detail below, a UE 8 may not always include CPE/ICI-RS in the resources allocated to xPUSCH for that UE 8. For example, the UE 8 may determine whether or not to include CPE/ICI-RS based on information about the modulation and coding scheme (MCS) for the xPUSCH transmission in the UL scheduling assignment; and even when the order of complexity of the MCS indicates the use of CPE/ICI-RS, different CPE/ICI-RS patterns may be predefined for different orders of complexity of the MCS.

Each of the four spatially multiplexed UEs 8 is assigned its own CPE/ICI-RS antenna port (AP). These are numbered as 50, 51, 52 and 53 in the example of FIG. 4.

The eNB baseband processor 20 (via the eNB antenna 26 and eNB RF front end 24) extracts xPUSCH data for each of the four UEs 8 from the radio transmissions in OFDM symbols #3 to #13. The eNB baseband processor 20 uses the CPE/ICI-RS for each UE 8 to correct and/or compensate for common phase error and/or inter carrier interference as part of extracting xPUSCH data for the respective UE 8 (STEP 704 of FIG. 7).

Figure 8:
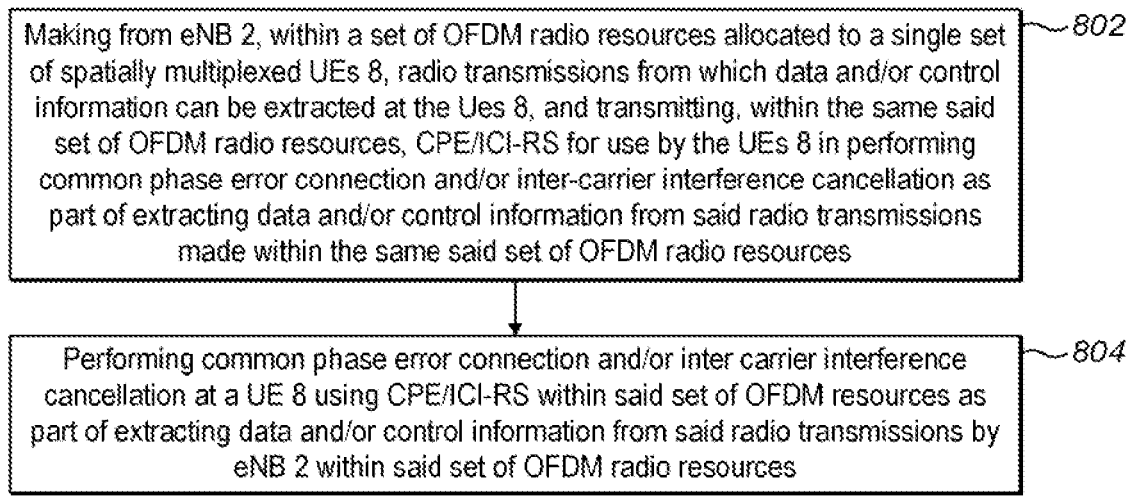
FIG. 8 illustrates another example of a set of downlink operations at a UE and eNB according to another embodiment of the invention.

FIG. 8 illustrates an example of downlink operations at eNB 2 and UE 8 according to one embodiment. All operations carried out by the UE processor 34 follow program code stored at UE memory 32; and all operations carried out by the eNB processor 20 follow program code stored at eNB memory 22.

Figure 5:
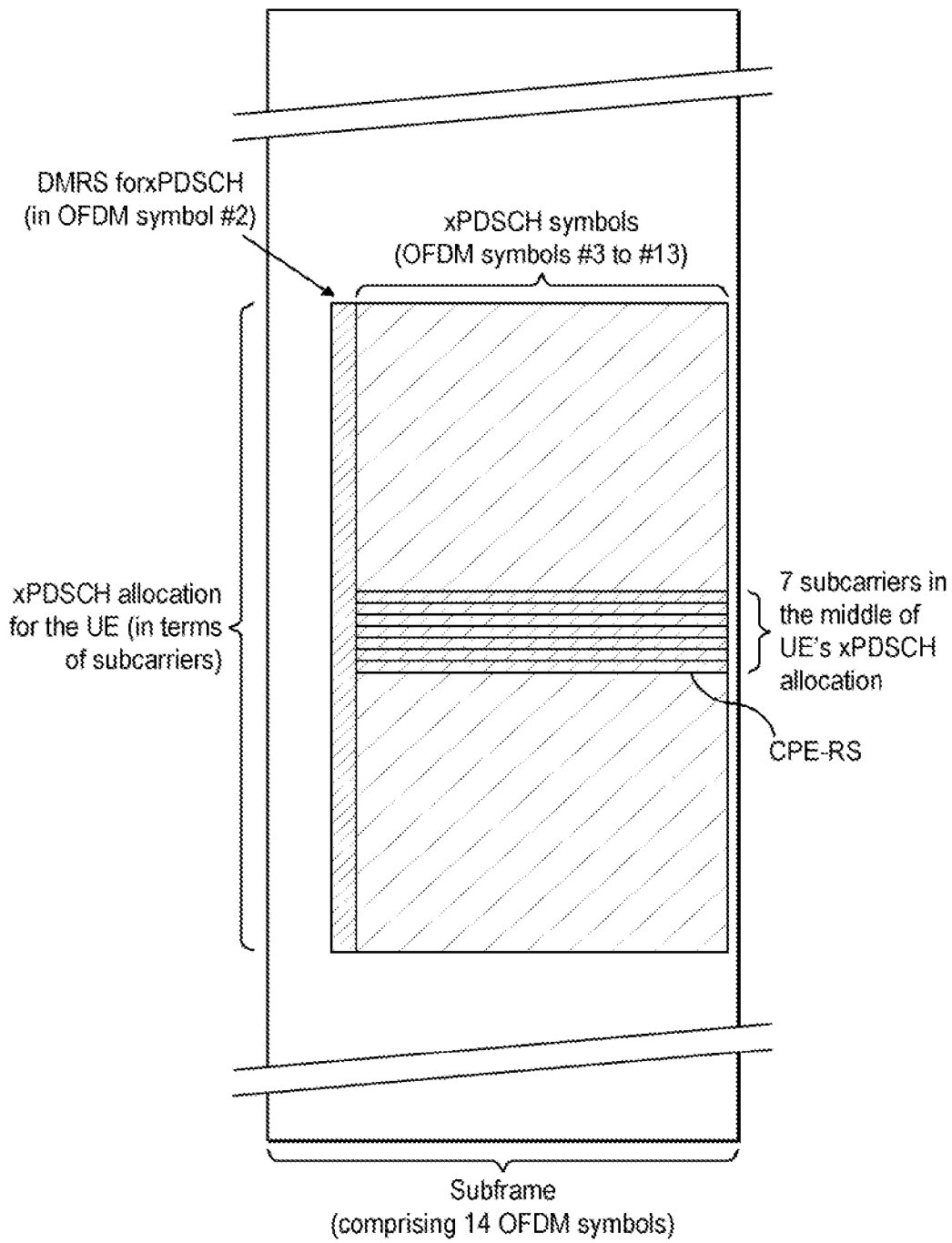
FIG. 5 illustrates one example of configuring CPE/ICI-RS for a set of downlink OFDM radio resources allocated to four spatially multiplexed UEs.

With additional reference to FIG. 5, a set of OFDM time-frequency resources for a cell operated by eNB 2 is commonly assigned to downlink transmissions to, e.g., four spatially multiplexed UEs 8. The set of OFDM resources is defined by a combination of: (i) in the frequency domain, a sub-set of the total number of OFDM subcarriers for the cell, and (ii) in the time domain, a specific sub-frame comprising 14 OFDM symbols. As shown in FIG. 5, OFDM symbol #2 is used for demodulation reference signals (DMRS), and OFDM symbols #3 to #13 are allocated to a physical downlink shared channel (e.g. xPDSCH to use the terminology adopted for $5^{th}$ generation (5G) systems).

The eNB baseband processor 20 makes (via eNB front end 24 and eNB antenna 26) radio transmissions on OFDM symbols #3 to #13 from which 4 spatially multiplexed (according to a MU-MIMO technique) UEs 8 to which the set of OFDM radio resources of FIG. 5 is allocated, can extract xPDSCH data; and the eNB processor 24 includes within the same group of OFDM symbols #3 to #13 CPE/ICI-RS (Common Phase Error/Inter Carrier Interference Reference Signals) via a set of consecutive OFDM sub-carriers at a predetermined location within the whole sub-set of OFDM subcarriers commonly allocated to the 4 UEs, e.g. in the middle of the total number of sub-carriers commonly allocated to the 4 UEs (STEP 802 of FIG. 8). The CPE/ICI-RS are used by the four UEs 8 to correct and compensate for common phase error and/or inter-carrier interference as part of the process of extracting xPDSCH data from the radio transmissions within OFDM symbols #3 to #13. The xPDSCH data is rate matched or punctured around the CPE/ICI-RS. The location of the set of OFDM subcarriers used for CPE/ICI-RS is known to the UEs 8.

All eNB antenna ports (APs) via which the CPE/ICI-RS signals are transmitted may use the same OFDM subcarrier resources in the downlink example of FIG. 5, because the receiving UEs 8 all perform CPE and/or ICI correction from a common source.

Accordingly, a more compressed structure can be used for the downlink CPE/ICI-RS for a set of OFDM resources assigned to a plurality of spatially multiplexed UEs, compared to the uplink CPE/ICI-RS for a set of OFDM resources assigned to a plurality of spatially multiplexed UEs. In the example of FIG. 5, CPE/ICI-RS occupy a relatively large number of OFDM sub-carriers (e.g. seven OFDM sub-carriers) in order to enable both CPE and ICI correction for PDSCH radio transmissions made according to a modulation and coding scheme of relatively high complexity. The CPE/ICI-RS occupy OFDM subcarriers of the total subset of carriers commonly allocated to the 4 spatially multiplexed UEs in a localized manner; and the CPE/ICI-RS are transmitted from the same antenna ports used to transmit xPDSCH to the UEs. Including the CPE/ICI-RS inside the radio resources allocated to xPDSCH avoids problems associated with distributed resource allocation.

Figure 6:
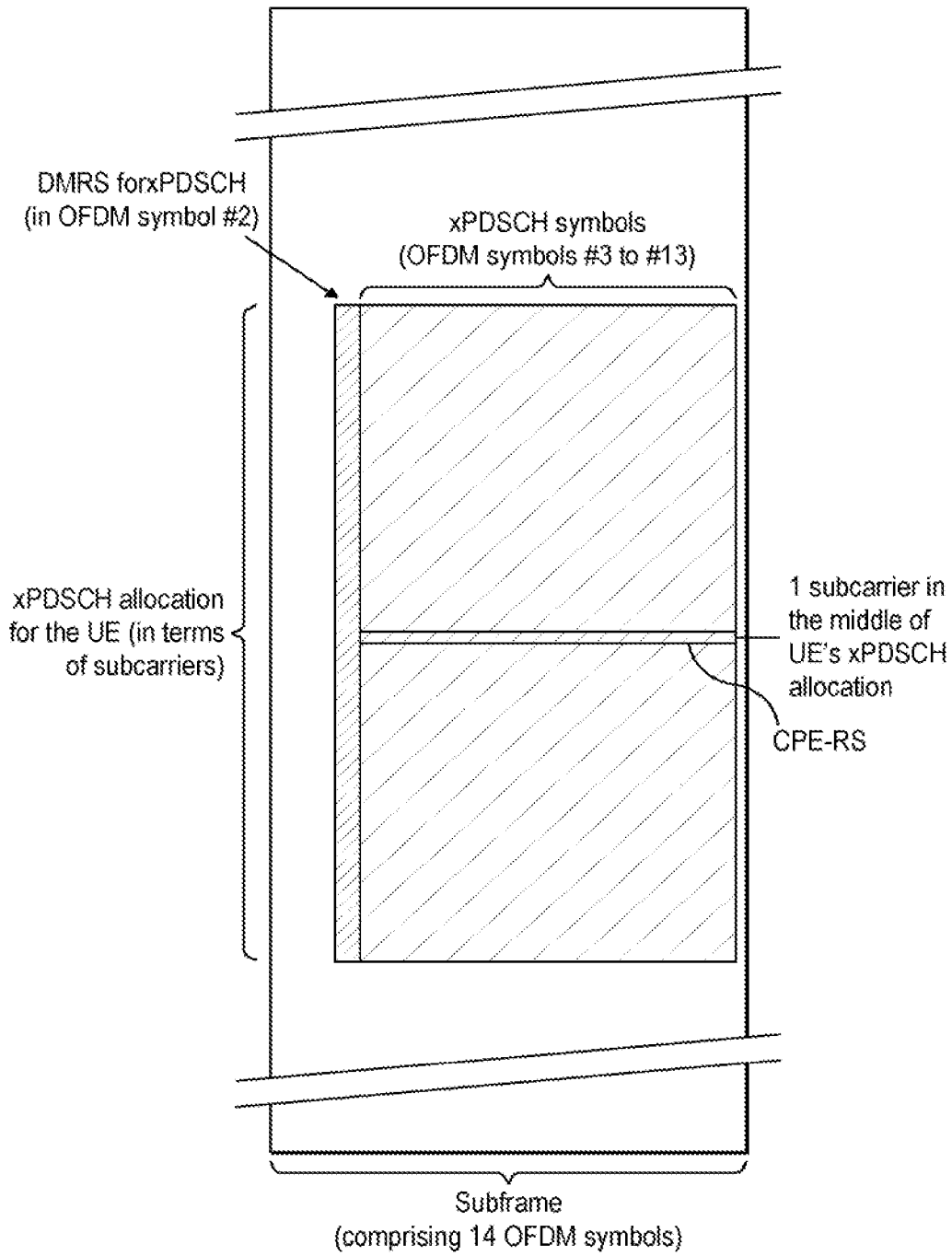
FIG. 6 illustrates another example of configuring CPE/ICI-RS for a set of downlink OFDM radio resources allocated to four spatially multiplexed UEs.

According to another example shown in FIG. 6, the downlink CPE/ICI RS occupy only one OFDM subcarrier (e.g. the middle subcarrier) of the subset of carriers commonly allocated to downlink PDSCH for the four spatially-multiplexed UEs. Such a pattern may be suitable for xPDSCH transmissions having a modulation and coding scheme of relatively low complexity, for which there is less need for inter-carrier-cancellation, and the receiver (i.e. UEs) only needs to perform common phase error correction (and not inter-carrier cancellation) as part of extracting xPDSCH data from the radio transmissions. Depending on the allocation bandwidth, more CPE/ICI-RS may be allocated in a distributed manner within the radio resources allocated to xPDSCH for the UEs.

At each of the four spatially multiplexed UEs to which the set of radio resources is commonly allocated, the UE baseband processor 34 (via UE antenna 38 and UE RF front end 36) extracts xPDSCH data from the radio transmissions, and uses the CPE/ICI-RS to correct/compensate for common phase error and/or inter-carrier-interference as part of extracting xPDSCH data from the radio transmissions (STEP 804 of FIG. 8).

As described above, different CPE/ICI-RS patterns may be used for downlink and uplink transmissions. The CPE/ICI-RS pattern (or choice of CPE/ICI-RS patterns) may be optimized independently for each of the downlink and uplink.

As discussed in more detail below, the eNB 2 may not always include CPE/ICI-RS in the resources commonly allocated to xPDSCH for the four spatially multiplexed UEs. For example, the eNB 2 may determine whether or not to include CPE/ICI-RS based on what modulation and coding scheme (MCS) is to be used for the xPDSCH transmissions, and may determine what CPE/ICI-RS pattern to adopt according to the order of complexity of the MCS for the xPDSCH transmissions. The UEs 8 are informed about which MCS is to be used in the DL scheduling assignment and the UE memory 32 stores predetermined rules about how different MCSs map to different CPE/ICI-RS patterns; and the UE baseband processor 34 can therefore also determine if CPE/ICI-RS are to be included, and if so, according to which CPE/ICI-RS pattern.

Embodiments described above are for the example of spatially-multiplexed UEs sharing the same time-frequency radio resources, but the technique is equally applicable to sets of OFDM time-frequency resources allocated to single UEs.

As mentioned above, the technique may involve rules about when to include CPE/ICI-RS and, if so, which CPE/ICI-RS pattern to use. For example, the technique may involve a rule according to which CPE/ICI-RS are included only when the modulation for the xPDSCH/xPUSCH transmissions has an order of complexity above a predetermined threshold e.g. only when using 64QAM or higher orders of modulation. The technique may involve a rule according to which the CPE/ICI-RS are included only when the MCS for the xPDSCH/xPUSCH transmissions has an order of complexity above a predetermined threshold. According to one specific example, the number of OFDM sub-carriers used for CPE/ICI-RS within the xPDSCH/xPUSCH allocation depends on the MCS for the xPDSCH/xPUSCH transmission according to the following rules: (a) no CPE/ICI-RS for QPSK (quadrature phase-shift keying) modulation; (b) CPE/ICI-RS on a relatively small predetermined number of subcarriers within the xPDSCH/xPUSCH allocation for 16QAM (quadrature amplitude modulation), sufficient to support common phase error correction; and (c) CPE/ICI-RS on a larger predetermined number of subcarriers within the xPDSCH/xPUSCH correction for 64QAM or higher modulations, sufficient to support both common phase error correction and inter-carrier-interference cancellation.

Alternatively and/or additionally, the CPE/ICI-RS may be included only when the transmitting/receiving UE is one of a predetermined one or more category of UE. For example, the CPE/ICI-RS may only be included when the transmitting/receiving UE is of a UE category that supports high MCS and/or has sufficient processing power.

Alternatively and/or additionally, the CPE/ICI-RS may be included only when operating with predetermined carrier frequencies (e.g. carrier frequencies above a predetermined threshold value) and/or when operating with predetermined subcarrier spacings (e.g. a subcarrier spacing below a predetermined threshold value). CPE/ICI may be less of an issue with relatively low carrier frequencies and/or relatively large subcarrier spacings.

Figure 9:
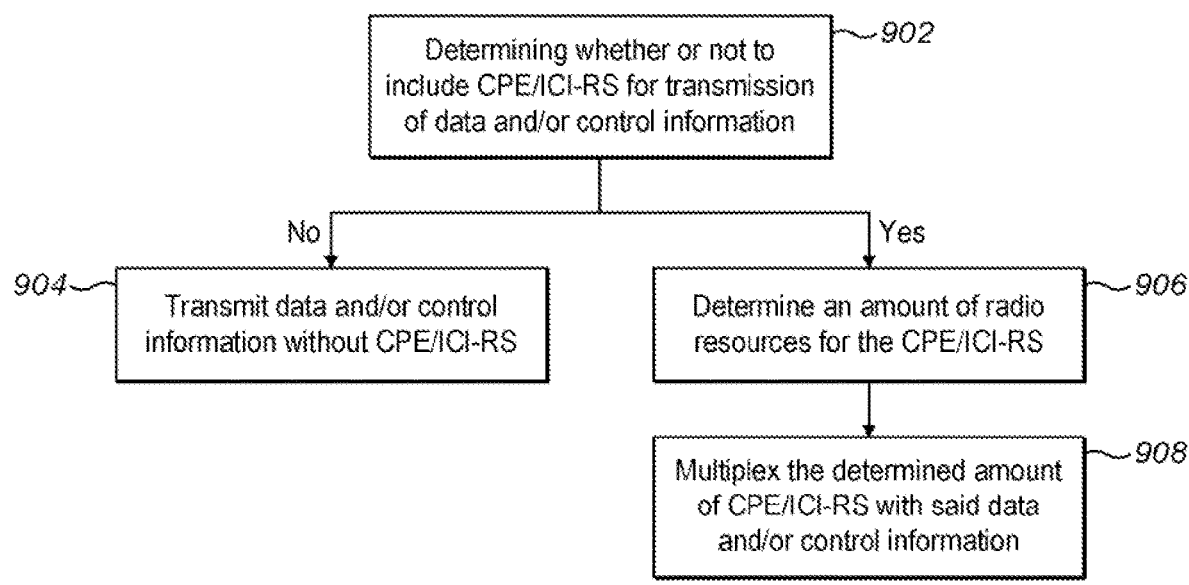
FIG. 9 illustrates an example of operations at a transmitting device (UE or eNB) of FIG. 1 according to an embodiment of the invention.

FIG. 9 illustrates one example for a set of operations at a transmitting device (UE 8 or eNB 2) to determine an amount of radio resources for the CPE/ICI-RS. The baseband processor determines whether or not radio transmission of data and/or control information is to be accompanied by transmission of CPE-ICI-RS, based on one or more of the determining factors mentioned above (STEP 902). If the result of this determination by the baseband processor is negative, the baseband processor transmits (via RF front end and antenna) the data and/or control information without any CPE-ICI-RS (STEP 904). On the other hand, if the result of the determination of STEP 902 is positive, the baseband processor determines an amount of radio resources for the CPE/ICI-RS based on one or more of the determining factors mentioned above (STEP 906); and multiplexes the determined amount of CPE/ICI-RS with the data and/or control information for transmission via RF front end and antenna.

In the examples illustrated in FIGS. 4 to 6, the CPE/ICI-RS only occupy OFDM symbols in the xPDSCH/xPUSCH part of the set of radio resources allocated to the spatially multiplexed UEs (or a single UE). In other words, CPE/ICI-RS may not occupy the OFDM symbols allocated to control channels, particularly if demodulation RS (DMRS) are multiplexed into the same OFDM symbol with control channel symbols.

In the techniques described above, the CPE/ICI-RS are "in-band signals" from the transmitted data channel viewpoint (i.e. not transmitted outside the set of radio resources for the xPDSCH/xPUSCH transmissions for which they are to be used to correct common phase error and/or cancel inter-carrier-interference). This ensures that xPDSCH/xPUSCH transmissions can always be kept as a localized transmissions even when multiplexed with CPE/ICI-RS.

Appropriately adapted computer program code product may be used for implementing the embodiments, when loaded to a computer. The program code product for providing the operation may be stored on and provided by means of a carrier medium such as a carrier disc, card or tape. A possibility is to download the program code product via a data network. Implementation may be provided with appropriate software in a server.

Embodiments of the invention may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre stored design modules. Once the design for a semiconductor circuit has been completed, the resultant design, in a standardized electronic format (e.g., Opus, GDSII, or the like) may be transmitted to a semiconductor fabrication facility or "fab" for fabrication.

In addition to the modifications explicitly mentioned above, it will be evident to a person skilled in the art that various other modifications of the described embodiment may be made within the scope of the invention.

What is claimed is:

1. A method comprising:
    depending at least on information about a modulation and coding scheme to be used for transmission of data or control information for a physical shared channel, determining orthogonal frequency division multiplexing (OFDM) symbols in the physical shared channel for transmission of one or more common phase error/inter-carrier interference (CPE/ICI) reference signals;
    mapping the one or more CPE/ICI reference signals to the OFDM symbols in the physical shared channel, wherein the OFDM symbols to which the one or more CPE/ICI reference signals are mapped are different than other OFDM symbols used for demodulation reference signals for the physical shared channel; and
    transmitting, via radio communication, the one or more CPE/ICI reference signals for compensation for phase noise, wherein the one or more CPE/ICI reference signals are in-band signals within the physical shared channel for the data or control information, and wherein transmitting the one or more CPE/ICI reference signals comprises transmitting the one or more CPE/ICI reference signals from a same one or more antenna ports as used to transmit the data or control information.

2. A method of claim 1, wherein said physical shared channel comprises a physical uplink shared channel.

3. A method comprising:
    receiving, via radio communication, one or more common phase error/inter-carrier interference (CPE/ICI) reference signals for compensation for phase noise,
    wherein the one or more CPE/ICI reference signals are in-band signals within a physical shared channel for transmission of data or control information,
    wherein the one or more CPE/ICI reference signals are mapped to orthogonal frequency division multiplexing (OFDM) symbols in the physical shared channel determined based on a modulation and coding scheme used for transmission of the data or control information for the physical shared channel,
    wherein the OFDM symbols to which the one or more CPE/ICI reference signals are mapped are different than other OFDM symbols used for demodulation reference signals for the physical shared channel, and
    wherein the one or more CPE/ICI reference signals are received following a transmission of the one or more CPE/ICI reference signals from a same one or more antenna ports as used to transmit the data or control information; the method further comprising:

using the one or more CPE/ICI reference signals to compensate for phase noise.

4. A method of claim 3, wherein said physical shared channel comprises a physical downlink shared channel.

5. An apparatus comprising:
at least one processor; and
at least one non-transitory memory including computer program code, wherein the memory and computer program code are configured, with the processor, to cause the apparatus to:
depending at least on information about a modulation and coding scheme to be used for transmission of data or control information for a physical shared channel, determine orthogonal frequency division multiplexing (OFDM) symbols in the physical shared channel for transmission of one or more common phase error/inter-carrier interference (CPE/ICI) reference signals;
map the one or more CPE/ICI reference signals to the OFDM symbols in the physical shared channel, wherein the OFDM symbols to which the one or more CPE/ICI reference signals are mapped are different than other OFDM symbols used for demodulation reference signals for the physical shared channel; and
transmit, via radio communication, the one or more CPE/ICI reference signals for compensation for phase noise, wherein the one or more CPE/ICI reference signals are in-band signals within the physical shared channel for the data or control information, and wherein the one or more CPE/ICI reference signals are transmitted from a same one or more antenna ports as used to transmit the data or control information.

6. An apparatus of claim 5, wherein said physical shared channel comprises a physical uplink shared channel.

7. An apparatus comprising:
at least one processor; and
at least one non-transitory memory including computer program code, wherein the at least one non-transitory memory and computer program code are configured, with the processor, to cause the apparatus to:
receive, via radio communication, one or more common phase error/inter-carrier interference (CPE/ICI) reference signals for compensation for phase noise,
wherein the one or more CPE/ICI reference signals are in-band signals within a physical shared channel for transmission of data or control information,
wherein the one or more CPE/ICI reference signals are mapped to orthogonal frequency division multiplexing (OFDM) symbols in the physical shared channel determined based on a modulation and coding scheme used for transmission of the data or control information for the physical shared channel,
wherein the OFDM symbols to which the one or more CPE/ICI reference signals are mapped are different than other OFDM symbols used for demodulation reference signals for the physical shared channel, and
wherein the one or more CPE/ICI reference signals are received following a transmission of the one or more CPE/ICI reference signals from a same one or more antenna ports as used to transmit the data or control information,
wherein the at least one non-transitory memory and computer program code are further configured, with the processor, to cause the apparatus to:
use the one or more CPE/ICI reference signals to compensate for phase noise.

8. An apparatus of claim 7, wherein the physical shared channel comprises a physical downlink shared channel.

9. A computer program product comprising a non-transitory medium storing instructions, wherein said instructions, when executed by a processor, cause at least:
depending at least on information about a modulation and coding scheme to be used for transmission of data or control information for a physical shared channel, determining orthogonal frequency division multiplexing (OFDM) symbols in the physical shared channel for transmission of one or more common phase error/inter-carrier interference (CPE/ICI) reference signals;
mapping the one or more CPE/ICI reference signals to the OFDM symbols in the physical shared channel, wherein the OFDM symbols to which the one or more CPE/ICI reference signals are mapped are different than other OFDM symbols used for demodulation reference signals for the physical shared channel; and
transmitting, via radio communication, the one or more CPE/ICI reference signals for compensation for phase noise, wherein the one or more CPE/ICI reference signals are in-band signals within the physical shared channel for the data or control information, and wherein transmitting the one or more CPE/ICI reference signals comprises transmitting the one or more CPE/ICI reference signals from a same one or more antenna ports as used to transmit the data or control information.

10. A computer program product of claim 9, wherein said physical shared channel comprises a physical uplink shared channel.

11. A computer program product comprising a non-transitory medium storing instructions, wherein said instructions, when executed by a processor, cause at least:
receiving, via radio communication, one or more common phase error/inter-carrier interference (CPE/ICI) reference signals for compensation for phase noise,
wherein the one or more CPE/ICI reference signals are in-band signals within a physical shared channel for transmission of data or control information,
wherein the one or more CPE/ICI reference signals are mapped to orthogonal frequency division multiplexing (OFDM) symbols in the physical shared channel determined based on a modulation and coding scheme used for transmission of the data or control information for the physical shared channel,
wherein the OFDM symbols to which the one or more CPE/ICI reference signals are mapped are different than other OFDM symbols used for demodulation reference signals for the physical shared channel, and
wherein the one or more CPE/ICI reference signals are received following a transmission of the one or more CPE/ICI reference signals from a same one or more antenna ports as used to transmit the data or control information; the instructions, when executed by the processor, further causing at least:
using the one or more CPE/ICI reference signals to compensate for phase noise.

12. A computer program product of claim 11, wherein said physical shared channel comprises a physical downlink shared channel.

* * * * *

UNITED STATES PATENT AND TRADEMARK OFFICE
CERTIFICATE OF CORRECTION

PATENT NO. : 11,750,423 B2
APPLICATION NO. : 17/179622
DATED : September 5, 2023
INVENTOR(S) : Kari Pajukoski et al.

It is certified that error appears in the above-identified patent and that said Letters Patent is hereby corrected as shown below:

On the Title Page

In the drawing, reference numeral 702, Line 1, delete "UE8," and insert -- UE 8, --, therefor.

In the drawing, reference numeral 704, Line 4, delete "Ues 8" and insert -- UEs 8 --, therefor.

In the Drawings

In sheet 3 of 6, FIG. 5, delete "forxPDSCH" and insert -- for xPDSCH --, therefor.

In sheet 4 of 6, FIG. 6, delete "forxPDSCH" and insert -- for xPDSCH --, therefor.

In sheet 5 of 6, FIG. 7, reference numeral 702, Line 1, delete "UE8," and insert -- UE 8, --, therefor.

In sheet 5 of 6, FIG. 7, reference numeral 704, Line 4, delete "Ues 8" and insert -- UEs 8 --, therefor.

In sheet 5 of 6, FIG. 8, reference numeral 802, Line 3, delete "Ues 8" and insert -- UEs 8 --, therefor.

Signed and Sealed this
Twelfth Day of March, 2024

Katherine Kelly Vidal
*Director of the United States Patent and Trademark Office*